(12) United States Patent
Li

(10) Patent No.: US 11,449,455 B2
(45) Date of Patent: Sep. 20, 2022

(54) METHOD AND SYSTEM FOR FACILITATING A HIGH-CAPACITY OBJECT STORAGE SYSTEM WITH CONFIGURATION AGILITY AND MIXED DEPLOYMENT FLEXIBILITY

(71) Applicant: Alibaba Group Holding Limited, Grand Cayman (KY)

(72) Inventor: Shu Li, Bothell, WA (US)

(73) Assignee: Alibaba Group Holding Limited, George Town (KY)

( * ) Notice: Subject to any disclaimer, the term of this patent is extended or adjusted under 35 U.S.C. 154(b) by 337 days.

(21) Appl. No.: 16/743,833

(22) Filed: Jan. 15, 2020

(65) Prior Publication Data

US 2021/0216487 A1     Jul. 15, 2021

(51) Int. Cl.
  *G06F 11/30* (2006.01)
  *G06F 13/16* (2006.01)
  (Continued)

(52) U.S. Cl.
  CPC ........ *G06F 13/4221* (2013.01); *G06F 9/3877* (2013.01); *G06F 11/3034* (2013.01);
  (Continued)

(58) Field of Classification Search
  None
  See application file for complete search history.

(56) References Cited

U.S. PATENT DOCUMENTS 3,893,071 A    7/1975  Bossen
4,562,494 A   12/1985  Bond
(Continued)

FOREIGN PATENT DOCUMENTS

JP    2003022209    1/2003
JP    2011175422    9/2011
(Continued)

OTHER PUBLICATIONS https://web.archive.org/web/20071130235034/http://en.wikipedia.org:80/wiki/logical_block_addressing Wikipedia screen shot retriefed on wayback Nov. 20, 2007 showing both physical and logical addressing used historically to access data on storage devices (Year: 2007).

(Continued)

*Primary Examiner* — Ernest Unelus
*Assistant Examiner* — Dayton Lewis-Taylor
(74) *Attorney, Agent, or Firm* — Shun Yao; Yao Legal Services, Inc.

(57) ABSTRACT

During operation, the system receives, by a master node, a first I/O request with associated data, wherein the master node is in communication with a first plurality of storage drives via a switch based on a network protocol, wherein the master node and the first plurality of storage drives are allowed to reside in different cabinets, and wherein a respective collection of storage drives are coupled to a converter module, which is configured to convert data between the network protocol and an I/O protocol used to access the storage drives. The system identifies, by the master node, a first collection of storage drives from the first plurality on which to execute the first I/O request. The system executes, based on a communication via the switch and a converter module associated with the first collection of storage drives, the first I/O request on the first collection of storage drives.

17 Claims, 9 Drawing Sheets

(51) Int. Cl.
  *G06F 13/22* (2006.01)
  *G06F 13/42* (2006.01)
  *G06F 9/38* (2018.01)
  *H04L 67/1097* (2022.01)

(52) U.S. Cl.
  CPC ...... *G06F 11/3058* (2013.01); *G06F 13/1642* (2013.01); *G06F 13/225* (2013.01); *H04L 67/1097* (2013.01)

(56) References Cited

U.S. PATENT DOCUMENTS

| | | |
|---|---|---|
| 4,718,067 A | 1/1988 | Peters |
| 4,775,932 A | 10/1988 | Oxley |
| 4,858,040 A | 8/1989 | Hazebrouck |
| 5,394,382 A | 2/1995 | Hu |
| 5,602,693 A | 2/1997 | Brunnett |
| 5,715,471 A | 2/1998 | Otsuka |
| 5,732,093 A | 3/1998 | Huang |
| 5,802,551 A | 9/1998 | Komatsu |
| 5,930,167 A | 7/1999 | Lee |
| 6,098,185 A | 8/2000 | Wilson |
| 6,148,377 A | 11/2000 | Carter |
| 6,226,650 B1 | 5/2001 | Mahajan et al. |
| 6,243,795 B1 | 6/2001 | Yang |
| 6,457,104 B1 | 9/2002 | Tremaine |
| 6,658,478 B1 | 12/2003 | Singhal |
| 6,795,894 B1 | 9/2004 | Neufeld |
| 7,351,072 B2 | 4/2008 | Muff |
| 7,565,454 B2 | 7/2009 | Zuberi |
| 7,599,139 B1 | 10/2009 | Bombet |
| 7,953,899 B1 | 5/2011 | Hooper |
| 7,958,433 B1 | 6/2011 | Yoon |
| 8,085,569 B2 | 12/2011 | Kim |
| 8,144,512 B2 | 3/2012 | Huang |
| 8,166,233 B2 | 4/2012 | Schibilla |
| 8,260,924 B2 | 9/2012 | Koretz |
| 8,281,061 B2 | 10/2012 | Radke |
| 8,452,819 B1 | 5/2013 | Sorenson, III |
| 8,516,284 B2 | 8/2013 | Chan |
| 8,527,544 B1 | 9/2013 | Colgrove |
| 8,751,763 B1 | 6/2014 | Ramarao |
| 8,819,367 B1 | 8/2014 | Fallone |
| 8,825,937 B2 | 9/2014 | Atkisson |
| 8,832,688 B2 | 9/2014 | Tang |
| 8,868,825 B1 | 10/2014 | Hayes |
| 8,904,061 B1 | 12/2014 | O'Brien, III |
| 8,949,208 B1 | 2/2015 | Xu |
| 9,015,561 B1 | 4/2015 | Hu |
| 9,031,296 B2 | 5/2015 | Kaempfer |
| 9,043,545 B2 | 5/2015 | Kimmel |
| 9,088,300 B1 | 7/2015 | Chen |
| 9,092,223 B1 | 7/2015 | Pani |
| 9,129,628 B1 | 9/2015 | Fallone |
| 9,141,176 B1 | 9/2015 | Chen |
| 9,208,817 B1 | 12/2015 | Li |
| 9,213,627 B2 | 12/2015 | Van Acht |
| 9,280,472 B1 | 3/2016 | Dang |
| 9,280,487 B2 | 3/2016 | Candelaria |
| 9,311,939 B1 | 4/2016 | Malina |
| 9,336,340 B1 | 5/2016 | Dong |
| 9,436,595 B1 | 9/2016 | Benitez |
| 9,495,263 B2 | 11/2016 | Pang |
| 9,529,601 B1 | 12/2016 | Dharmadhikari |
| 9,529,670 B2 | 12/2016 | O'Connor |
| 9,569,454 B2 | 2/2017 | Ebsen |
| 9,575,982 B1 | 2/2017 | Sankara Subramanian |
| 9,588,698 B1 | 3/2017 | Karamcheti |
| 9,588,977 B1 | 3/2017 | Wang |
| 9,607,631 B2 | 3/2017 | Rausch |
| 9,671,971 B2 | 6/2017 | Trika |
| 9,747,202 B1 | 8/2017 | Shaharabany |
| 9,836,232 B1 | 12/2017 | Vasquez |
| 9,852,076 B1 | 12/2017 | Garg |
| 9,875,053 B2 | 1/2018 | Frid |
| 9,912,530 B2 | 3/2018 | Singatwaria |
| 9,923,562 B1 | 3/2018 | Vinson |
| 9,946,596 B2 | 4/2018 | Hashimoto |
| 10,013,169 B2 | 7/2018 | Fisher |
| 10,199,066 B1 | 2/2019 | Feldman |
| 10,229,735 B1 | 3/2019 | Natarajan |
| 10,235,198 B2 | 3/2019 | Qiu |
| 10,268,390 B2 | 4/2019 | Warfield |
| 10,318,467 B2 | 6/2019 | Barzik |
| 10,361,722 B2 | 7/2019 | Lee |
| 10,437,670 B1 | 10/2019 | Koltsidas |
| 10,459,663 B2 | 10/2019 | Agombar |
| 10,642,522 B2 | 5/2020 | Li |
| 10,649,657 B2 | 5/2020 | Zaidman |
| 10,678,432 B1 | 6/2020 | Dreier |
| 10,756,816 B1 | 8/2020 | Dreier |
| 10,928,847 B2 | 2/2021 | Suresh |
| 10,990,526 B1 | 4/2021 | Lam |
| 2001/0032324 A1 | 10/2001 | Slaughter |
| 2001/0046295 A1 | 11/2001 | Sako |
| 2002/0010783 A1 | 1/2002 | Primak |
| 2002/0039260 A1 | 4/2002 | Kilmer |
| 2002/0073358 A1 | 6/2002 | Atkinson |
| 2002/0095403 A1 | 7/2002 | Chandrasekaran |
| 2002/0112085 A1 | 8/2002 | Berg |
| 2002/0161890 A1 | 10/2002 | Chen |
| 2003/0074319 A1 | 4/2003 | Jaquette |
| 2003/0145274 A1 | 7/2003 | Hwang |
| 2003/0163594 A1 | 8/2003 | Aasheim |
| 2003/0163633 A1 | 8/2003 | Aasheim |
| 2003/0217080 A1 | 11/2003 | White |
| 2004/0010545 A1 | 1/2004 | Pandya |
| 2004/0066741 A1 | 4/2004 | Dinker |
| 2004/0103238 A1 | 5/2004 | Avraham |
| 2004/0143718 A1 | 7/2004 | Chen |
| 2004/0255171 A1 | 12/2004 | Zimmer |
| 2004/0267752 A1 | 12/2004 | Wong |
| 2004/0268278 A1 | 12/2004 | Hoberman |
| 2005/0038954 A1 | 2/2005 | Saliba |
| 2005/0097126 A1 | 5/2005 | Cabrera |
| 2005/0138325 A1 | 6/2005 | Hofstee |
| 2005/0144358 A1 | 6/2005 | Conley |
| 2005/0149827 A1 | 7/2005 | Lambert |
| 2005/0174670 A1 | 8/2005 | Dunn |
| 2005/0177672 A1 | 8/2005 | Rao |
| 2005/0177755 A1 | 8/2005 | Fung |
| 2005/0195635 A1 | 9/2005 | Conley |
| 2005/0235067 A1 | 10/2005 | Creta |
| 2005/0235171 A1 | 10/2005 | Igari |
| 2006/0031709 A1 | 2/2006 | Hiraiwa |
| 2006/0101197 A1 | 5/2006 | Georgis |
| 2006/0156009 A1 | 7/2006 | Shin |
| 2006/0156012 A1 | 7/2006 | Beeson |
| 2006/0184813 A1 | 8/2006 | Bui |
| 2007/0033323 A1 | 2/2007 | Gorobets |
| 2007/0061502 A1 | 3/2007 | Lasser |
| 2007/0101096 A1 | 5/2007 | Gorobets |
| 2007/0250756 A1 | 10/2007 | Gower |
| 2007/0266011 A1 | 11/2007 | Rohrs |
| 2007/0283081 A1 | 12/2007 | Lasser |
| 2007/0283104 A1 | 12/2007 | Wellwood |
| 2007/0285980 A1 | 12/2007 | Shimizu |
| 2008/0028223 A1 | 1/2008 | Rhoads |
| 2008/0034154 A1 | 2/2008 | Lee |
| 2008/0065805 A1 | 3/2008 | Wu |
| 2008/0082731 A1 | 4/2008 | Karamcheti |
| 2008/0112238 A1 | 5/2008 | Kim |
| 2008/0163033 A1 | 7/2008 | Yim |
| 2008/0195829 A1 | 8/2008 | Wilsey |
| 2008/0301532 A1 | 12/2008 | Uchikawa |
| 2009/0006667 A1 | 1/2009 | Lin |
| 2009/0089544 A1 | 4/2009 | Liu |
| 2009/0113219 A1 | 4/2009 | Aharonov |
| 2009/0125788 A1 | 5/2009 | Wheeler |
| 2009/0183052 A1 | 7/2009 | Kanno |
| 2009/0254705 A1 | 10/2009 | Abali |
| 2009/0282275 A1 | 11/2009 | Yermalayeu |
| 2009/0287956 A1 | 11/2009 | Flynn |
| 2009/0307249 A1 | 12/2009 | Koifman |

(56) References Cited

U.S. PATENT DOCUMENTS

| | | |
|---|---|---|
| 2009/0307426 A1 | 12/2009 | Galloway |
| 2009/0310412 A1 | 12/2009 | Jang |
| 2010/0031000 A1 | 2/2010 | Flynn |
| 2010/0169470 A1 | 7/2010 | Takashige |
| 2010/0217952 A1 | 8/2010 | Iyer |
| 2010/0229224 A1 | 9/2010 | Etchegoyen |
| 2010/0241848 A1 | 9/2010 | Smith |
| 2010/0281254 A1 | 11/2010 | Carro |
| 2010/0321999 A1 | 12/2010 | Yoo |
| 2010/0325367 A1 | 12/2010 | Kornegay |
| 2010/0332922 A1 | 12/2010 | Chang |
| 2011/0031546 A1 | 2/2011 | Uenaka |
| 2011/0055458 A1 | 3/2011 | Kuehne |
| 2011/0055471 A1 | 3/2011 | Thatcher |
| 2011/0060722 A1 | 3/2011 | Li |
| 2011/0072204 A1 | 3/2011 | Chang |
| 2011/0099418 A1 | 4/2011 | Chen |
| 2011/0153903 A1 | 6/2011 | Hinkle |
| 2011/0161784 A1 | 6/2011 | Selinger |
| 2011/0191525 A1 | 8/2011 | Hsu |
| 2011/0218969 A1 | 9/2011 | Anglin |
| 2011/0231598 A1 | 9/2011 | Hatsuda |
| 2011/0239083 A1 | 9/2011 | Kanno |
| 2011/0252188 A1 | 10/2011 | Weingarten |
| 2011/0258514 A1 | 10/2011 | Lasser |
| 2011/0289263 A1 | 11/2011 | McWilliams |
| 2011/0289280 A1 | 11/2011 | Koseki |
| 2011/0292538 A1 | 12/2011 | Haga |
| 2011/0296411 A1 | 12/2011 | Tang |
| 2011/0299317 A1 | 12/2011 | Shaeffer |
| 2011/0302353 A1 | 12/2011 | Confalonieri |
| 2011/0302408 A1 | 12/2011 | McDermott |
| 2012/0017037 A1 | 1/2012 | Riddle |
| 2012/0039117 A1 | 2/2012 | Webb |
| 2012/0084523 A1 | 4/2012 | Littlefield |
| 2012/0089774 A1 | 4/2012 | Kelkar |
| 2012/0096330 A1 | 4/2012 | Przybylski |
| 2012/0117399 A1 | 5/2012 | Chan |
| 2012/0147021 A1 | 6/2012 | Cheng |
| 2012/0151253 A1 | 6/2012 | Horn |
| 2012/0159099 A1 | 6/2012 | Lindamood |
| 2012/0159289 A1 | 6/2012 | Piccirillo |
| 2012/0173792 A1 | 7/2012 | Lassa |
| 2012/0203958 A1 | 8/2012 | Jones |
| 2012/0210095 A1 | 8/2012 | Nellans |
| 2012/0233523 A1 | 9/2012 | Krishnamoorthy |
| 2012/0246392 A1 | 9/2012 | Cheon |
| 2012/0278579 A1 | 11/2012 | Goss |
| 2012/0284435 A1* | 11/2012 | Myrah .............. G06F 13/10 710/74 |
| 2012/0284587 A1 | 11/2012 | Yu |
| 2012/0297100 A1* | 11/2012 | Du .............. H04L 69/08 710/105 |
| 2012/0324312 A1 | 12/2012 | Moyer |
| 2012/0331207 A1 | 12/2012 | Lassa |
| 2013/0013880 A1 | 1/2013 | Tashiro |
| 2013/0016970 A1 | 1/2013 | Koka |
| 2013/0018852 A1 | 1/2013 | Barton |
| 2013/0024605 A1 | 1/2013 | Sharon |
| 2013/0054822 A1 | 2/2013 | Mordani |
| 2013/0054932 A1* | 2/2013 | Acharya .............. G06F 3/0619 711/E12.078 |
| 2013/0061029 A1 | 3/2013 | Huff |
| 2013/0073798 A1 | 3/2013 | Kang |
| 2013/0080391 A1 | 3/2013 | Raichstein |
| 2013/0111094 A1* | 5/2013 | Culter .............. G06F 13/00 710/300 |
| 2013/0138871 A1 | 5/2013 | Chiu |
| 2013/0145085 A1 | 6/2013 | Yu |
| 2013/0145089 A1 | 6/2013 | Eleftheriou |
| 2013/0151759 A1 | 6/2013 | Shim |
| 2013/0159251 A1 | 6/2013 | Skrenta |
| 2013/0159723 A1 | 6/2013 | Brandt |
| 2013/0166820 A1 | 6/2013 | Batwara |
| 2013/0173845 A1 | 7/2013 | Aslam |
| 2013/0179898 A1 | 7/2013 | Fang |
| 2013/0191601 A1 | 7/2013 | Peterson |
| 2013/0205183 A1 | 8/2013 | Fillingim |
| 2013/0219131 A1 | 8/2013 | Alexandron |
| 2013/0227347 A1 | 8/2013 | Cho |
| 2013/0238955 A1 | 9/2013 | D Abreu |
| 2013/0254622 A1 | 9/2013 | Kanno |
| 2013/0318283 A1 | 11/2013 | Small |
| 2013/0318395 A1 | 11/2013 | Kalavade |
| 2013/0329492 A1 | 12/2013 | Yang |
| 2014/0006688 A1 | 1/2014 | Yu |
| 2014/0019650 A1 | 1/2014 | Li |
| 2014/0025638 A1 | 1/2014 | Hu |
| 2014/0082273 A1 | 3/2014 | Segev |
| 2014/0082412 A1 | 3/2014 | Matsumura |
| 2014/0095769 A1 | 4/2014 | Borkenhagen |
| 2014/0095827 A1 | 4/2014 | Wei |
| 2014/0108414 A1 | 4/2014 | Stillerman |
| 2014/0108891 A1 | 4/2014 | Strasser |
| 2014/0164447 A1 | 6/2014 | Tarafdar |
| 2014/0164879 A1 | 6/2014 | Tam |
| 2014/0181532 A1 | 6/2014 | Camp |
| 2014/0195564 A1 | 7/2014 | Talagala |
| 2014/0215129 A1 | 7/2014 | Kuzmin |
| 2014/0223079 A1 | 8/2014 | Zhang |
| 2014/0233950 A1 | 8/2014 | Luo |
| 2014/0250259 A1 | 9/2014 | Ke |
| 2014/0279927 A1 | 9/2014 | Constantinescu |
| 2014/0304452 A1 | 10/2014 | De La Iglesia |
| 2014/0310574 A1 | 10/2014 | Yu |
| 2014/0359229 A1 | 12/2014 | Cota-Robles |
| 2014/0365707 A1 | 12/2014 | Talagala |
| 2014/0379965 A1 | 12/2014 | Gole |
| 2015/0006792 A1 | 1/2015 | Lee |
| 2015/0019798 A1 | 1/2015 | Huang |
| 2015/0039849 A1 | 2/2015 | Lewis |
| 2015/0082317 A1 | 3/2015 | You |
| 2015/0106556 A1 | 4/2015 | Yu |
| 2015/0106559 A1 | 4/2015 | Cho |
| 2015/0121031 A1 | 4/2015 | Feng |
| 2015/0142752 A1 | 5/2015 | Chennamsetty |
| 2015/0143030 A1 | 5/2015 | Gorobets |
| 2015/0186657 A1 | 7/2015 | Nakhjiri |
| 2015/0199234 A1 | 7/2015 | Choi |
| 2015/0227316 A1 | 8/2015 | Warfield |
| 2015/0234845 A1 | 8/2015 | Moore |
| 2015/0269964 A1 | 9/2015 | Fallone |
| 2015/0277937 A1 | 10/2015 | Swanson |
| 2015/0286477 A1 | 10/2015 | Mathur |
| 2015/0294684 A1 | 10/2015 | Qjang |
| 2015/0301964 A1 | 10/2015 | Brinicombe |
| 2015/0304108 A1 | 10/2015 | Obukhov |
| 2015/0310916 A1 | 10/2015 | Leem |
| 2015/0317095 A1 | 11/2015 | Voigt |
| 2015/0341123 A1 | 11/2015 | Nagarajan |
| 2015/0347025 A1 | 12/2015 | Law |
| 2015/0363271 A1 | 12/2015 | Haustein |
| 2015/0363328 A1 | 12/2015 | Candelaria |
| 2015/0372597 A1 | 12/2015 | Luo |
| 2016/0014039 A1 | 1/2016 | Reddy |
| 2016/0026575 A1 | 1/2016 | Samanta |
| 2016/0041760 A1 | 2/2016 | Kuang |
| 2016/0048327 A1 | 2/2016 | Nuwan |
| 2016/0048341 A1 | 2/2016 | Constantinescu |
| 2016/0054922 A1 | 2/2016 | Awasthi |
| 2016/0062885 A1 | 3/2016 | Ryu |
| 2016/0077749 A1 | 3/2016 | Ravimohan |
| 2016/0077764 A1 | 3/2016 | Ori |
| 2016/0077968 A1 | 3/2016 | Sela |
| 2016/0098344 A1 | 4/2016 | Gorobets |
| 2016/0098350 A1 | 4/2016 | Tang |
| 2016/0103631 A1 | 4/2016 | Ke |
| 2016/0110254 A1 | 4/2016 | Cronie |
| 2016/0124742 A1 | 5/2016 | Rangasamy |
| 2016/0132237 A1 | 5/2016 | Jeong |
| 2016/0141047 A1 | 5/2016 | Sehgal |
| 2016/0154601 A1 | 6/2016 | Chen |
| 2016/0155750 A1 | 6/2016 | Yasuda |
| 2016/0162187 A1 | 6/2016 | Lee |

(56) References Cited

U.S. PATENT DOCUMENTS

| | | |
|---|---|---|
| 2016/0179399 A1 | 6/2016 | Melik-Martirosian |
| 2016/0188223 A1 | 6/2016 | Camp |
| 2016/0188890 A1 | 6/2016 | Naeimi |
| 2016/0203000 A1 | 7/2016 | Parmar |
| 2016/0224267 A1 | 8/2016 | Yang |
| 2016/0232103 A1 | 8/2016 | Schmisseur |
| 2016/0234297 A1 | 8/2016 | Ambach |
| 2016/0239074 A1 | 8/2016 | Lee |
| 2016/0239380 A1 | 8/2016 | Wideman |
| 2016/0274636 A1 | 9/2016 | Kim |
| 2016/0306699 A1 | 10/2016 | Resch |
| 2016/0306853 A1 | 10/2016 | Sabaa |
| 2016/0321002 A1 | 11/2016 | Jung |
| 2016/0335085 A1 | 11/2016 | Scalabrino |
| 2016/0342345 A1 | 11/2016 | Kankani |
| 2016/0343429 A1 | 11/2016 | Nieuwejaar |
| 2016/0350002 A1 | 12/2016 | Vergis |
| 2016/0350385 A1 | 12/2016 | Poder |
| 2016/0364146 A1 | 12/2016 | Kuttner |
| 2016/0381442 A1 | 12/2016 | Heanue |
| 2017/0004037 A1 | 1/2017 | Park |
| 2017/0010652 A1 | 1/2017 | Huang |
| 2017/0075583 A1 | 3/2017 | Alexander |
| 2017/0075594 A1 | 3/2017 | Badam |
| 2017/0091110 A1 | 3/2017 | Ash |
| 2017/0109199 A1 | 4/2017 | Chen |
| 2017/0109232 A1 | 4/2017 | Cha |
| 2017/0123655 A1 | 5/2017 | Sinclair |
| 2017/0147499 A1 | 5/2017 | Mohan |
| 2017/0161202 A1 | 6/2017 | Erez |
| 2017/0162235 A1 | 6/2017 | De |
| 2017/0168986 A1 | 6/2017 | Sajeepa |
| 2017/0177217 A1 | 6/2017 | Kanno |
| 2017/0177259 A1 | 6/2017 | Motwani |
| 2017/0185498 A1 | 6/2017 | Gao |
| 2017/0192848 A1 | 7/2017 | Pamies-Juarez |
| 2017/0199823 A1 | 7/2017 | Hayes |
| 2017/0212708 A1 | 7/2017 | Suhas |
| 2017/0220254 A1 | 8/2017 | Warfield |
| 2017/0221519 A1 | 8/2017 | Matsuo |
| 2017/0228157 A1 | 8/2017 | Yang |
| 2017/0242722 A1 | 8/2017 | Qiu |
| 2017/0249162 A1 | 8/2017 | Tsirkin |
| 2017/0262176 A1 | 9/2017 | Kanno |
| 2017/0262178 A1 | 9/2017 | Hashimoto |
| 2017/0262217 A1 | 9/2017 | Pradhan |
| 2017/0269998 A1 | 9/2017 | Jung |
| 2017/0279460 A1 | 9/2017 | Camp |
| 2017/0285976 A1 | 10/2017 | Durham |
| 2017/0286311 A1 | 10/2017 | Juenemann |
| 2017/0322888 A1 | 11/2017 | Booth |
| 2017/0344470 A1 | 11/2017 | Yang |
| 2017/0344491 A1 | 11/2017 | Pandurangan |
| 2017/0353576 A1 | 12/2017 | Guim Bernat |
| 2018/0024772 A1 | 1/2018 | Madraswala |
| 2018/0024779 A1 | 1/2018 | Kojima |
| 2018/0033491 A1 | 2/2018 | Marelli |
| 2018/0052797 A1 | 2/2018 | Barzik |
| 2018/0067847 A1 | 3/2018 | Oh |
| 2018/0069658 A1 | 3/2018 | Benisty |
| 2018/0074730 A1 | 3/2018 | Inoue |
| 2018/0076828 A1 | 3/2018 | Kanno |
| 2018/0088867 A1 | 3/2018 | Kaminaga |
| 2018/0107591 A1 | 4/2018 | Smith |
| 2018/0113631 A1 | 4/2018 | Zhang |
| 2018/0131633 A1* | 5/2018 | Li .................. H04L 47/821 |
| 2018/0143780 A1 | 5/2018 | Cho |
| 2018/0150640 A1 | 5/2018 | Li |
| 2018/0165038 A1 | 6/2018 | Authement |
| 2018/0165169 A1 | 6/2018 | Camp |
| 2018/0165340 A1 | 6/2018 | Agarwal |
| 2018/0167268 A1 | 6/2018 | Liguori |
| 2018/0173620 A1 | 6/2018 | Cen |
| 2018/0188970 A1 | 7/2018 | Liu |
| 2018/0189175 A1 | 7/2018 | Ji |
| 2018/0189182 A1 | 7/2018 | Wang |
| 2018/0212951 A1 | 7/2018 | Goodrum |
| 2018/0219561 A1 | 8/2018 | Litsyn |
| 2018/0226124 A1 | 8/2018 | Perner |
| 2018/0232151 A1 | 8/2018 | Badam |
| 2018/0260148 A1 | 9/2018 | Klein |
| 2018/0270110 A1 | 9/2018 | Chugtu |
| 2018/0293014 A1 | 10/2018 | Ravimohan |
| 2018/0300203 A1 | 10/2018 | Kathpal |
| 2018/0321864 A1 | 11/2018 | Benisty |
| 2018/0322024 A1 | 11/2018 | Nagao |
| 2018/0329776 A1 | 11/2018 | Lai |
| 2018/0336921 A1 | 11/2018 | Ryun |
| 2018/0349396 A1 | 12/2018 | Blagojevic |
| 2018/0356992 A1 | 12/2018 | Lamberts |
| 2018/0357126 A1 | 12/2018 | Dhuse |
| 2018/0373428 A1 | 12/2018 | Kan |
| 2018/0373655 A1 | 12/2018 | Liu |
| 2018/0373664 A1 | 12/2018 | Vijayrao |
| 2019/0012111 A1 | 1/2019 | Li |
| 2019/0050327 A1 | 2/2019 | Li |
| 2019/0065085 A1 | 2/2019 | Jean |
| 2019/0073261 A1 | 3/2019 | Halbert |
| 2019/0073262 A1 | 3/2019 | Chen |
| 2019/0087089 A1 | 3/2019 | Yoshida |
| 2019/0087115 A1 | 3/2019 | Li |
| 2019/0087328 A1 | 3/2019 | Kanno |
| 2019/0116127 A1 | 4/2019 | Pismenny |
| 2019/0171532 A1 | 6/2019 | Abadi |
| 2019/0172820 A1 | 6/2019 | Meyers |
| 2019/0196748 A1 | 6/2019 | Badam |
| 2019/0196907 A1 | 6/2019 | Khan |
| 2019/0205206 A1 | 7/2019 | Hornung |
| 2019/0212949 A1 | 7/2019 | Pletka |
| 2019/0220392 A1 | 7/2019 | Lin |
| 2019/0227927 A1 | 7/2019 | Miao |
| 2019/0272242 A1 | 9/2019 | Kachare |
| 2019/0278654 A1 | 9/2019 | Kaynak |
| 2019/0317901 A1 | 10/2019 | Kachare |
| 2019/0339998 A1 | 11/2019 | Momchilov |
| 2019/0377632 A1 | 12/2019 | Oh |
| 2019/0377821 A1 | 12/2019 | Pleshachkov |
| 2019/0391748 A1 | 12/2019 | Li |
| 2020/0004456 A1 | 1/2020 | Williams |
| 2020/0004674 A1 | 1/2020 | Williams |
| 2020/0013458 A1 | 1/2020 | Schreck |
| 2020/0042223 A1 | 2/2020 | Li |
| 2020/0042387 A1 | 2/2020 | Shani |
| 2020/0089430 A1 | 3/2020 | Kanno |
| 2020/0097189 A1 | 3/2020 | Tao |
| 2020/0143885 A1 | 5/2020 | Kim |
| 2020/0159425 A1 | 5/2020 | Flynn |
| 2020/0167091 A1 | 5/2020 | Haridas |
| 2020/0210309 A1 | 7/2020 | Jung |
| 2020/0218449 A1 | 7/2020 | Leitao |
| 2020/0225875 A1 | 7/2020 | Oh |
| 2020/0242021 A1 | 7/2020 | Gholamipour |
| 2020/0250032 A1 | 8/2020 | Goyal |
| 2020/0257598 A1 | 8/2020 | Yazovitsky |
| 2020/0326855 A1 | 10/2020 | Wu |
| 2020/0328192 A1 | 10/2020 | Zaman |
| 2020/0348888 A1 | 11/2020 | Kim |
| 2020/0387327 A1 | 12/2020 | Hsieh |
| 2020/0401334 A1 | 12/2020 | Saxena |
| 2020/0409791 A1 | 12/2020 | Devriendt |
| 2021/0010338 A1 | 1/2021 | Santos |
| 2021/0089392 A1 | 3/2021 | Shirakawa |
| 2021/0103388 A1 | 4/2021 | Choi |
| 2021/0191635 A1 | 6/2021 | Hu |
| 2021/0286555 A1 | 9/2021 | Li |

FOREIGN PATENT DOCUMENTS

| | | |
|---|---|---|
| WO | 9418634 | 8/1994 |
| WO | 1994018634 | 8/1994 |

(56) References Cited

OTHER PUBLICATIONS

Ivan Picoli, Carla Pasco, Bjorn Jonsson, Luc Bouganim, Philippe Bonnet. "uFLIP-OC: Understanding Flash I/O Patterns on Open-Channel Solid-State Drives." APSys'17, Sep. 2017, Mumbai, India, pp. 1-7, 2017, <10.1145/3124680.3124741>. <hal-01654985>.
EMC Powerpath Load Balancing and Failover Comparison with native MPIO operating system solutions. Feb. 2011.
Tsuchiya, Yoshihiro et al. "DBLK: Deduplication for Primary Block Storage", MSST 2011, Denver, CO, May 23-27, 2011 pp. 1-5.
Chen Feng, et al. "CAFTL: A Content-Aware Flash Translation Layer Enhancing the Lifespan of Flash Memory based Solid State Devices"< FAST '11, San Jose, CA Feb. 15-17, 2011, pp. 1-14.
Wu, Huijun et al. "HPDedup: A Hybrid Prioritized Data Deduplication Mechanism for Primary Storage in the Cloud", Cornell Univ. arXiv: 1702.08153v2[cs.DC], Apr. 16, 2017, pp. 1-14.
WOW: Wise Ordering for Writes—Combining Spatial and Temporal Locality in Non-Volatile Caches by Gill (Year: 2005).
Helen H. W. Chan et al. "HashKV: Enabling Efficient Updated in KV Storage via Hashing", https://www.usenix.org/conference/atc18/presentation/chan, (Year: 2018).
S. Hong and D. Shin, "NAND Flash-Based Disk Cache Using SLC/MLC Combined Flash Memory," 2010 International Workshop on Storage Network Architecture and Parallel I/Os, Incline Village, NV, 2010, pp. 21-30.
Arpaci-Dusseau et al. "Operating Systems: Three Easy Pieces", Originally published 2015; Pertinent: Chapter 44; flash-based SSDs, available at http://pages.cs.wisc.edu/~remzi/OSTEP/.
Jimenex, X., Novo, D. and P. Ienne, "Pheonix:Reviving MLC Blocks as SLC to Extend NAND Flash Devices Lifetime," Design, Automation & Text in Europe Conference & Exhibition (DATE), 2013.
Yang, T. Wu, H. and W. Sun, "GD-FTL: Improving the Performance and Lifetime of TLC SSD by Downgrading Worn-out Blocks," IEEE 37th International Performance Computing and Communications Conference (IPCCC), 2018.
C. Wu, D. Wu, H. Chou and C. Cheng, "Rethink the Design of Flash Translation Layers in a Component-Based View", in IEEE Acess, vol. 5, pp. 12895-12912, 2017.
Po-Liang Wu, Yuan-Hao Chang and T. Kuo, "A file-system-aware FTL design for flash-memory storage systems," 2009, pp. 393-398.
S. Choudhuri and T. Givargis, "Preformance improvement of block based NAND flash translation layer", 2007 5th IEEE/ACM/IFIP International Conference on Hardware/Software Codesign and Systems Synthesis (CODES+ISSS). Saizburg, 2007, pp. 257-262.
A. Zuck, O. Kishon and S. Toledo. "LSDM: Improving the Preformance of Mobile Storage with a Log-Structured Address Remapping Device Driver", 2014 Eighth International Conference on Next Generation Mobile Apps, Services and Technologies, Oxford, 2014, pp. 221-228.
J. Jung and Y. Won, "nvramdisk: A Transactional Block Device Driver for Non-Volatile RAM", in IEEE Transactions on Computers, vol. 65, No. 2, pp. 589-600, Feb. 1, 2016.
Te I et al. (Pensieve: a Machine Assisted SSD Layer for Extending the Lifetime: (Year: 2018).
ARM ("Cortex-R5 and Cortex-R5F", Technical reference Manual, Revision r1p1) (Year:2011).

\* cited by examiner

METHOD AND SYSTEM FOR FACILITATING A HIGH-CAPACITY OBJECT STORAGE SYSTEM WITH CONFIGURATION AGILITY AND MIXED DEPLOYMENT FLEXIBILITY

BACKGROUND

Field

This disclosure is generally related to the field of data storage. More specifically, this disclosure is related to a high-capacity object storage system with configuration agility and mixed deployment flexibility.

Related Art

Today, various storage systems are being used to store and access the ever-increasing amount of digital content. A storage system can include storage servers with one or more storage devices or drives, and a storage device or drive can include storage media with a non-volatile memory (such as a solid state drive (SSD) or a hard disk drive (HDD)). An object storage system manages stored data as objects, rather than as files or blocks. As the amount of digital content increases, so increases the demand on object storage in terms of high availability, high capacity, and high performance. In order to deploy an object storage system on a worldwide scale which meets these demands, two important features to consider are cost reduction and availability consolidation.

One current storage system can include multiple just a bunch of disks or drives (JBODs) or just a bunch of flash (JBOF), where each JBOD/JBOF can include hundreds of storage drives with a PCIe/SAS fabric expansion. However, the deployment, operation, and maintenance of this current storage system may result in some constraints, which can limit the flexibility and performance of the overall storage system.

SUMMARY

One embodiment provides a system which facilitates operation of a storage system. During operation, the system receives, by a master node, a first I/O request with associated data, wherein the master node is in communication with a first plurality of storage drives via a switch based on a network protocol, wherein the master node and the first plurality of storage drives are allowed to reside in different cabinets, and wherein a respective collection of storage drives are coupled to a converter module, which is configured to convert data between the network protocol and an I/O protocol used to access the storage drives. The system identifies, by the master node, a first collection of storage drives from the first plurality on which to execute the first I/O request. The system executes, based on a communication via the switch and a converter module associated with the first collection of storage drives, the first I/O request on the first collection of storage drives.

In some embodiments, the first I/O request is associated with a first application. The system creates a first association between the master node and the first plurality of storage drives. The system receives a second I/O request associated with a second application, wherein the first application and the second application have different resource requirements. The system detects a condition to dynamically associate the master node with a second plurality of storage drives. The system removes the first association between the master node and the first plurality of storage drives. The system creates a second association between the master node and the second plurality of storage drives.

In some embodiments, detecting the condition is based on one or more of: a difference in capacity and input/output per second (IOPS) requirements between the first application and the second application; a first predetermined threshold for dynamically associating the master node with the second or a third plurality of storage drives; a second predetermined threshold for removing or creating an association between the master node and another plurality of storage drives; an amount of power budgeted to the different cabinets and other cabinets; an average amount of a number of IOPS per Gigabyte (GB); and a design of a respective storage drive of the first or the second plurality of storage drives.

In some embodiments, the resource requirements include one or more of a capacity requirement and an input/output per second (IOPS) requirement.

In some embodiments, the network protocol is an Ethernet protocol, and the I/O protocol is a Peripheral Component Interconnect Express (PCIe) protocol.

In some embodiments, the converter module includes an adaptor and a controller coupled to at least one expander. The adaptor comprises: a first integrated circuit configured, based on the network protocol, to process data received from or sent to the switch; and a second integrated circuit configured, based on the I/O protocol, to process data sent to or received from the storage drives via the controller and the at least one expander or directly via a lane.

In some embodiments, when the second integrated circuit processes data sent to or received from the storage drives via the controller and the at least one expander: the controller is a Serial Attached SCSI (SAS) controller, the expander is an SAS expander, and the storage drives are hard disk drives or solid state drives. When the second integrated circuit processes data sent to or received from the storage drives directly via the lane: the lane is a Peripheral Component Interconnect Express (PCIe) lane; and the storage drives are solid state drives or optane drives.

In some embodiments, the adaptor further comprises: a data path processor; a control path processor; a network offload engine; a PCIe root complex; and an internal memory.

In some embodiments, the master node, at least one other master node, the switch, at least one other switch, the first plurality of storage drives, and the second plurality of storage drives comprise an object storage system.

In some embodiments, the storage drives are one or more of: a solid state drive; a hard disk drive; an optane drive; and a storage device with a persistent memory which can be accessed via an SAS expander or a PCIe lane.

BRIEF DESCRIPTION OF THE FIGURES

In the figures, like reference numerals refer to the same figure elements.

DETAILED DESCRIPTION

Figure 1:
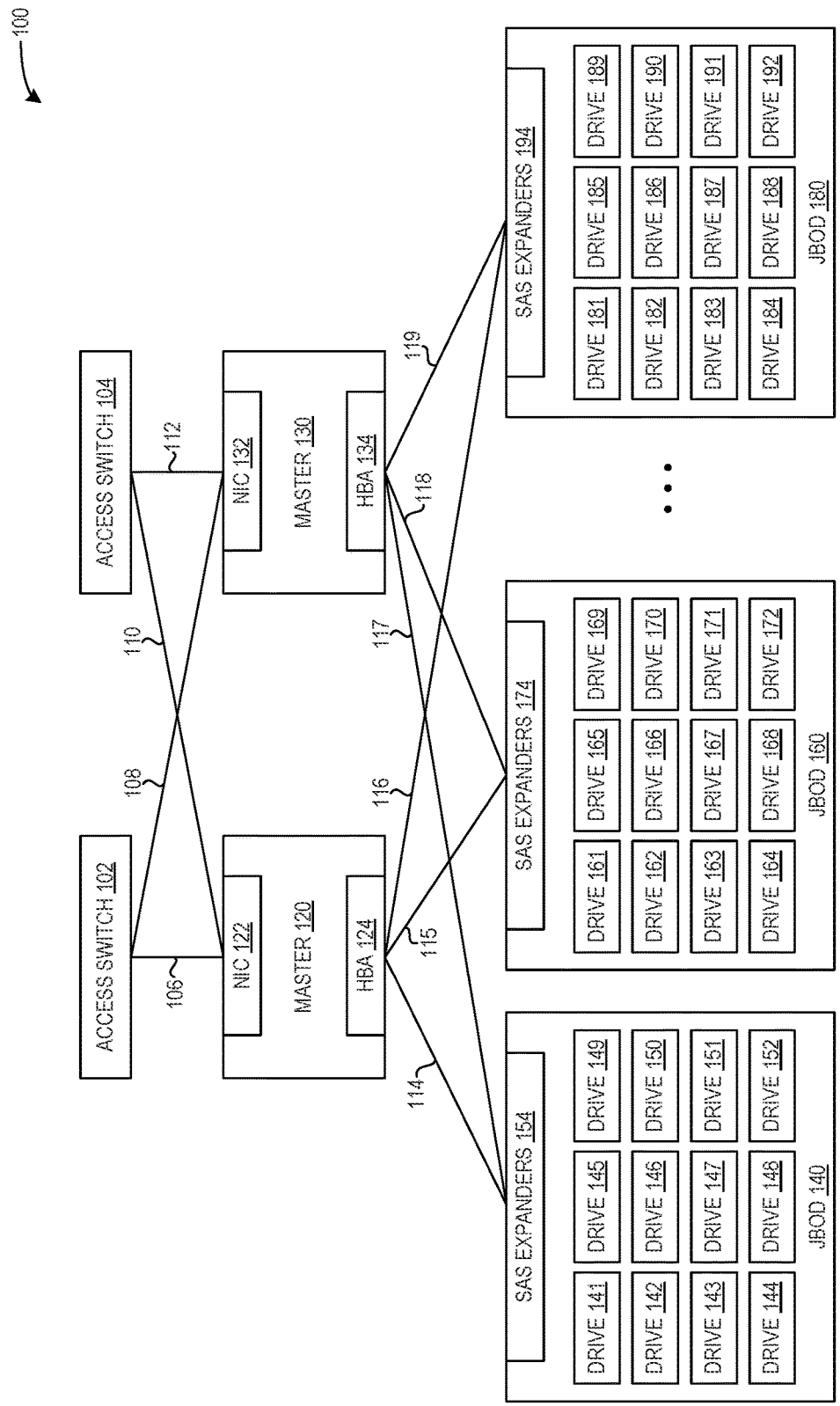
FIG. 1 illustrates an exemplary environment which facilitates operation of a storage system, in accordance with the prior art.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein facilitate an object storage system which provides flexibility in configuration and mixed deployment by modifying the JBOD design, Ethernet topology, and master configuration, which can efficiently enable the high-capacity drives of a JBOD.

As described above, in order to deploy an object storage system on a worldwide scale which meets the increasing demands of high-availability, high-capacity, and high-performance, two important features to consider are cost reduction and availability consolidation. One current storage system can include multiple JBODs (or JBOFs), where each JBOD can include hundreds of storage drives with a PCIe/SAS fabric expansion. However, the deployment, operation, and maintenance of this current storage system may result in some constraints. For example, for a given rack/cabinet configuration in a data center, dual access switches (ASWs) and dual master nodes may be used to achieve high availability. The master nodes may use a host bus adaptor (HBA) card to connect to the high-capacity JBODs, via, e.g., Serial Attached SCSI (SAS) cables. SAS expanders within a given JBOD can be used to further extend the SAS fabric to connect to the multiple storage drives. This cabinet configuration can result in several limitations, including: a required physical proximity of master nodes and paired JBODs based on a maximum length of the SAS cable; difficulty in repair and maintenance due to heavy reliance on on-site support; and a rigid and inflexible system configuration resulting in isolated JBODs with coarse operational granularity. An exemplary current cabinet configuration is described below in relation to FIG. 1.

The embodiments described herein address these challenges by providing an object storage system which modifies the JBOD design, Ethernet topology, and master configuration. The system can provide configuration agility and mixed deployment flexibility, which can efficiently enable the high-capacity drives and provide improvements in the efficiency and scalability of the overall storage system. Unlike the rigid cabinet configuration in current storage systems, the embodiments described herein can decouple the master nodes from the JBODs by using a universal Ethernet connection to replace the SAS fabric of current storage systems. Thus, JBODs and master nodes from different cabinets can form the described object storage system, as described below in relation to FIGS. 2 and 3. Furthermore, the described JBODs can connect directly to an access switch by using a converter module (e.g., a NIC-to-SAS board), which can bridge the conversion between the Ethernet and the SAS fabric. The NIC-to-SAS board can thus provide an equivalent (to SAS) Ethernet access to the drives in the JBODs, as described below in relation to FIGS. 3 and 4.

Moreover, the described embodiments can provide for an efficient mixed deployment, e.g., mixing varying input/outputs per second (IOPS) for different SLAs on the same drive to most efficiently utilize both the capacity and throughput of the drive, as described below in relation to FIG. 5. The described system can thus dynamically group the decoupled master nodes and JBODs based on the mixed deployment demands. These dynamic logical groupings can result in an improvement in the efficiency of allocating resources for the system. In addition, the system can improve the effective deployment of equipment (including servers, storage servers, storage drives, storage devices, etc.) by utilizing both the cabinet/rack space and the power budget more efficiently, as described below in relation to FIG. 5.

Thus, by modifying the Ethernet topology of the object storage system and by including a NIC-to-SAS board in each JBOD, the embodiments described herein can decouple the master nodes and JBODs, which can result in a more efficient and flexible configuration. Also, by providing a dynamic logical grouping of these decoupled master nodes and JBODs, the embodiments described herein can provide a significant reduction in cost due to fully and efficiently utilizing each drive of a JBOD, e.g., via a mixed deployment of applications which require different IOPS and capacity. These improvements can result in a consolidation of availability and a reduction in cost, which in turn can result in a more efficient overall storage system.

A "distributed storage system" or a "storage system" can include multiple storage servers. An "object storage system" refers to a storage system which stores data as objects. A "storage server" or a "storage system" can refer to a computing device which can include multiple storage devices or storage drives. A "storage device" or a "storage drive" refers to a device or a drive with a non-volatile memory which can provide persistent storage of data, e.g., a solid state drive (SSD), a hard disk drive (HDD), or a flash-based storage device. A storage system can also be a computer system. In this disclosure, a storage system or a computer system can include a plurality of master nodes and at least one collection of storage drives (e.g., a JBOD).

A "computing device" refers to any server, device, node, entity, or drive, including a master node, a collection of storage drives or files (JBODs/JBOFs), or any other entity which can provide any computing capabilities.

The term "master node" refers to a computing device which can receive an I/O request. In this disclosure, a master node can be coupled to or in communication with one or more switches (such as access switches), and can also be in communication with a plurality of storage drives (or a plurality of collections of storage drives, e.g., multiple JBODs/JBOFs). One or more master nodes can also be associated with a plurality of storage drives or pluralities of storage drives (e.g., collections of storage drives or JBODs/JBOFs).

The term "JBOD" refers to just a bunch or bundle of disks, and the term "JBOF" refers to just a bunch or bundle of flash. A JBOD or JBOF can be a collection of storage drives or storage devices.

The term "rack" generally refers to an open frame designed for housing or mounting electronic equipment modules or entities, including servers, storage drives, storage devices, computing devices, switches, and any other components that may communicate with or be coupled to an entity in the rack. The term "cabinet" refers to a physical structure which is similar to a rack but is generally partially or fully enclosed with sidewalls. Cabinets can also house or mount electronic equipment modules or entities similar to those listed above for racks. The terms "rack" and "cabinet" are used interchangeably in this disclosure.

The term "converter module" refers to a component or module which can be configured to convert data between a network protocol and an I/O protocol. An example of a converter module as used in this disclosure includes a "NIC-to-SAS board" and an "Ethernet-to-PCIe/SAS converter board," as described below in relation to FIGS. 2-4. The converter module can be implemented as a board, a card, a chip, and/or multiple components and integrated circuits.

Exemplary Operation of a Storage System in the Prior Art

FIG. 1 illustrates an exemplary environment 100 which facilitates operation of a storage system, in accordance with the prior art. Environment 100 can include: a pair of access switches (ASWs) 102 and 104; a pair of master nodes 120 and 130; and multiple JBODs 140, 160, and 180. Master node 120 can include a network interface card (NIC) 122 and a host bus adaptor card (HBA) 124; and master node 130 can include a NIC 132 and an HBA 134. Each JBOD can include SAS expanders and a plurality of storage drives. For example, JBOD 140 can include SAS expanders 154 and storage drives 141-152. Similarly: JBOD 160 can include SAS expanders 174 and storage drives 161-172; and JBOD 180 can include SAS expanders 194 and storage drives 181-192. Access switches 102 and 104 can be coupled to master nodes 120 and 130 via Ethernet cables 106, 108, 110, and 112. Master nodes 120 and 130 can be coupled to JBODs 140, 160, and 180 via SAS cables 114, 115, 116, 117, 118, and 119.

As described above, this configuration can result in several constraints. First, in order to maintain signal integrity, the length of the SAS cable is constrained by a maximum length of 1.5 meters. Thus, a master node and its paired or associated JBODs must be placed physically close to each other in the same cabinet. This limitation can affect the overall design of the cabinet. Furthermore, the cabinet must be designed with a sufficiently high power budget to accommodate these proximally placed components/devices, which can be especially difficult to deploy in data centers with prior generations of design and components/devices.

Second, the SAS fabric system relies heavily on on-site support, creating difficulties in making repairs and performing maintenance activities/operations. If a single storage drive (out of hundreds of storage drives) in a JBOD fails, an operator (e.g., a field engineer) must take the JBOD offline, replace the defective storage drive, and then place the JBOD back online. Given the hundreds of storage drives in each JBOD and the non-trivial likelihood of hardware failure, the operator may need to spend a certain amount of time to perform these tasks. During the time that a given JBOD is offline, several Petabytes (PB) of data may not be accessible, which can result in a service interrupt. Such a service interrupt can result in an inefficient storage system, and can also affect the Quality of Service (QoS) and any service level agreements (SLAs).

Third, the configuration of the current cabinets (with the proximally close collaboration of master nodes and JBODs connected via the SAS fabric) can result a rigid online resource re-allocation, in that each system (i.e., a set of connected master nodes and JBODs) is essentially an isolated, stand-alone island. Furthermore, the operational granularity can be coarse, and due to the large amount of data stored in each system, a single fault in the system can affect a wider range, e.g., result in errors across the system. These constraints can limit the flexibility and performance of the overall storage system, and can especially affect the availability of the resources and the overall cost.

Exemplary Operation of a Storage System With Redundancy and Host-Based Mapping

Figure 2:
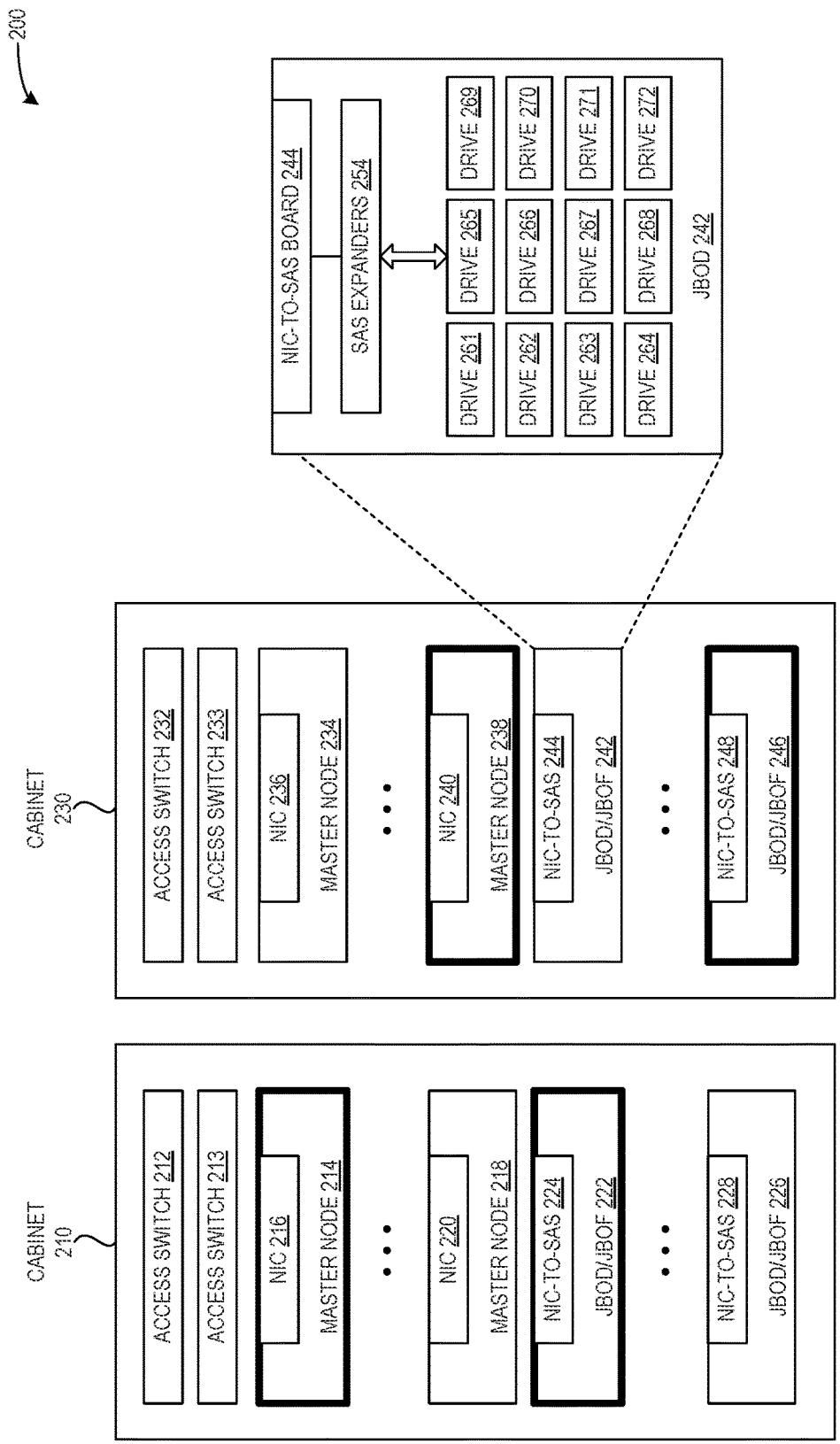
FIG. 2 illustrates an exemplary environment which facilitates operation of a storage system with decoupled master nodes and JBODs, in accordance with an embodiment of the present application.

The embodiments described herein provide a system which addresses the challenges described above in relation to prior art environment 100 of FIG. 1. FIG. 2 illustrates an exemplary environment 200 which facilitates operation of a storage system with decoupled master nodes and JBODs, in accordance with an embodiment of the present application. Environment 200 includes a cabinet 210 and a cabinet 230. Each cabinet can include a pair of access switches, a plurality of master nodes, and a plurality of JBODs/JBOFs. Each JBOD can include a converter module which is configured to convert data between a network protocol (e.g., Ethernet) and an I/O protocol used to access the storage drives of the JBOD (e.g., PCIe). Thus, unlike in prior art environment 100 of FIG. 1, which is constrained by, e.g., the requirement of a close physical proximity between the master nodes and the JBODs due to the maximum SAS cable length, the master nodes and JBODs of FIG. 2 can reside or are allowed to reside in different cabinets due to the converter module located in each JBOD.

For example, cabinet 210 can include: an access switch 212; an access switch 213; a master node 214 with a NIC 216; a master node 218 with a NIC 220; a JBOD/JBOF 222 with a NIC-to-SAS card 224; and a JBOD/JBOF 226 with a NIC-to-SAS card 228. Similarly, cabinet 230 can include: an access switch 232; an access switch 233; a master node 234 with a NIC 236; a master node 238 with a NIC 240; a JBOD/JBOF 242 with a NIC-to-SAS card 244; and a JBOD/JBOF 246 with a NIC-to-SAS card 248. As another example, JBOD 242 can include: a NIC-to-SAS card or board 244 (i.e., the converter module); SAS expanders 254; and drives 261-272.

In environment 200, the master nodes can communicate with a plurality of storage drives, which can include a collection (a single JBOD) of storage drives or collections (multiple JBODs) of storages drives. For example, master node 214 (which resides in cabinet 210) can be in communication with JBODs 222 and 226 (of the same cabinet 210) via access switches 212 and 213. Furthermore, master node 214 can be in communication with JBODs 242 and 246 of cabinet 230 via access switches 212 and 213 and via access switches 232 and 233 of cabinet 230. That is, a master node can be in communication with any plurality of storage drives in environment 200, where the master node and the plurality of storage drives are allowed to reside in different cabinets.

In addition, a master node can be associated with a plurality of storage drives, including a plurality of collections of storage drives, e.g., multiple JBODs. The master node and its associated JBODs can be allowed to reside in different cabinets. For example, master node 214 can be associated with JBOD 222 (which resides in the same cabinet 210 as master node 214) and JBOD 246 (which resides in a different cabinet 230 as master node 214).

Furthermore, a pair or plurality of master nodes can be associated with pluralities of storage drives, where each of the master nodes and pluralities of storage drives are allowed to reside in different cabinets. In FIG. 2, master nodes and JBODs depicted with a heavy shaded border can be associated with each other (as a logical grouping). For example, master nodes 214 and 238 (which each reside in different cabinets 210 and 230, respectively) can be associated with JBODs 222 and 246 (where these pluralities of storage drives also reside in different cabinets 210 and 230, respectively).

Thus, by decoupling the master nodes from the JBODs, the embodiments described herein allow an object storage system to provide logical groupings of associated masters and JBODs, by using the converter module associated with each collection of storage drives (e.g., NIC-to-SAS cards or boards 224, 228, 244, and 248) to provide communication between computing devices which reside in different cabinets (e.g., cabinets 210 and 230). An exemplary NIC-to-SAS board is described below in relation to FIG. 4.

Exemplary Ethernet Topology and Exemplary NIC-to-SAS Board/Card

Figure 3:
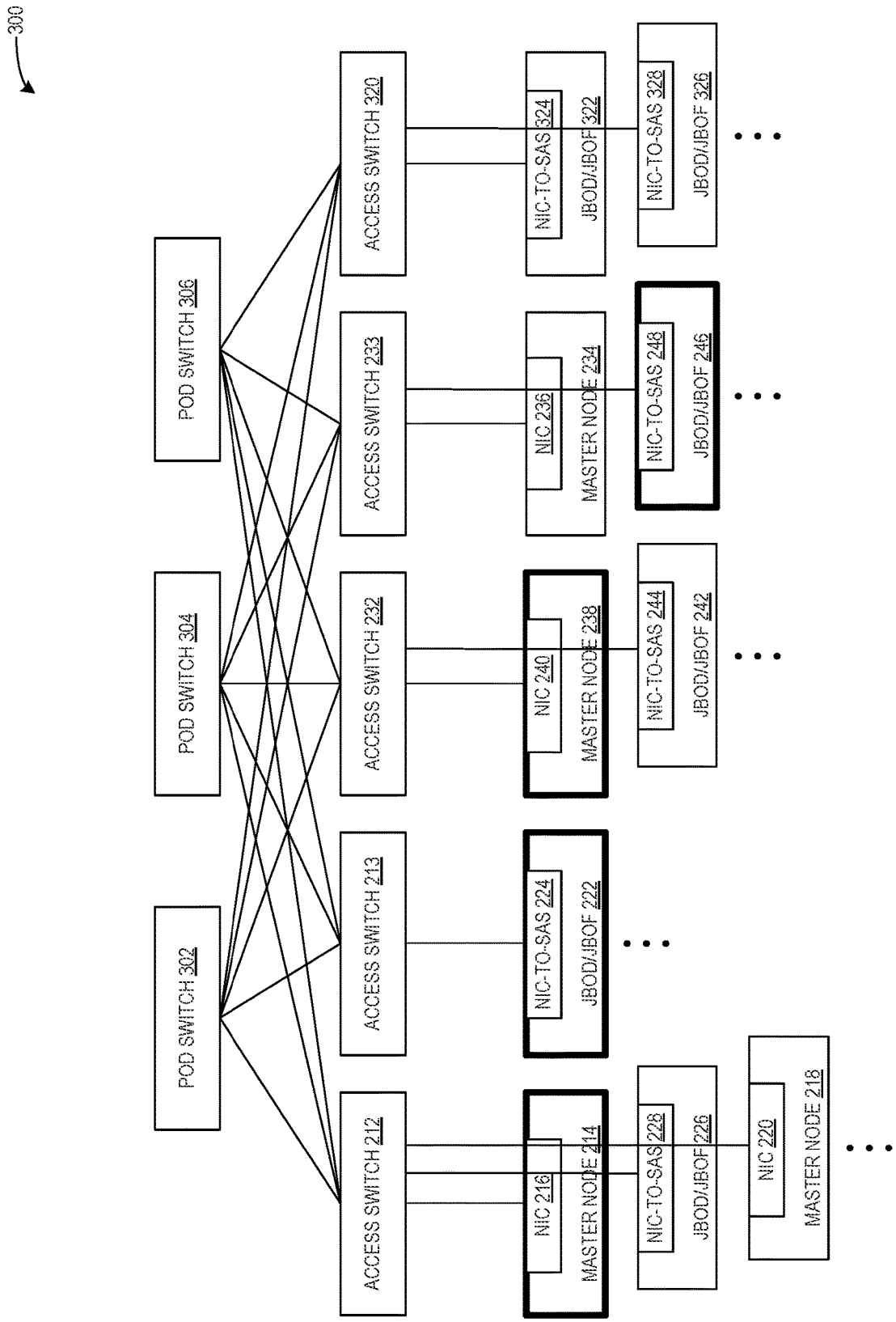
FIG. 3 depicts an exemplary Ethernet topology corresponding the system in FIG. 2, in accordance with the prior art.

FIG. 3 depicts an exemplary Ethernet topology 300 corresponding the system in FIG. 2, in accordance with the prior art. Topology 300 can include: pod switches 302, 304, and 306; access switches 212, 213, 232, 233, and 320; a plurality of master nodes 214, 218, 238, and 234; and a plurality of JBODs/JBOFs 226, 222, 242, 246, 322, and 326. Each pod switch can be coupled to or in communication with a plurality of access switches, and each access switch can be coupled to or in communication with a plurality of computing devices, such as master nodes and JBODs/JBOFs.

For example, each of pod switches 302, 304 and 306 can be coupled to or in communication with each of access switches 212, 213, 232, 233, and 320. Access switch 212 can be coupled to or in communication with at least master node 214, JBOD/JBOF 226, and master node 218. Access switch 213 can be coupled to or in communication with at least JBOD/JBOF 222. Access switch 232 can be coupled to or in communication with at least master node 238 and JBOD/JBOF 242. Access switch 233 can be coupled to or in communication with at least master node 234 and JBOD/JBOF 242. Access switch 320 can be coupled to or in communication with JBOD/JBOFs 322 and 326.

Note that topology 300 depicts the four associated computing devices from FIG. 2 in a logical grouping, as shown by the heavy shaded borders, where the four computing devices are coupled to four different access switches. However, this is for illustration purposes only; each of these four computing devices can be connected to a plurality of different access switches, where the four computing devices can reside in a plurality of different cabinets. Furthermore, as described below, the system can detect a condition to dynamically associate a master node with another plurality or collection of storage drives.

Figure 4:
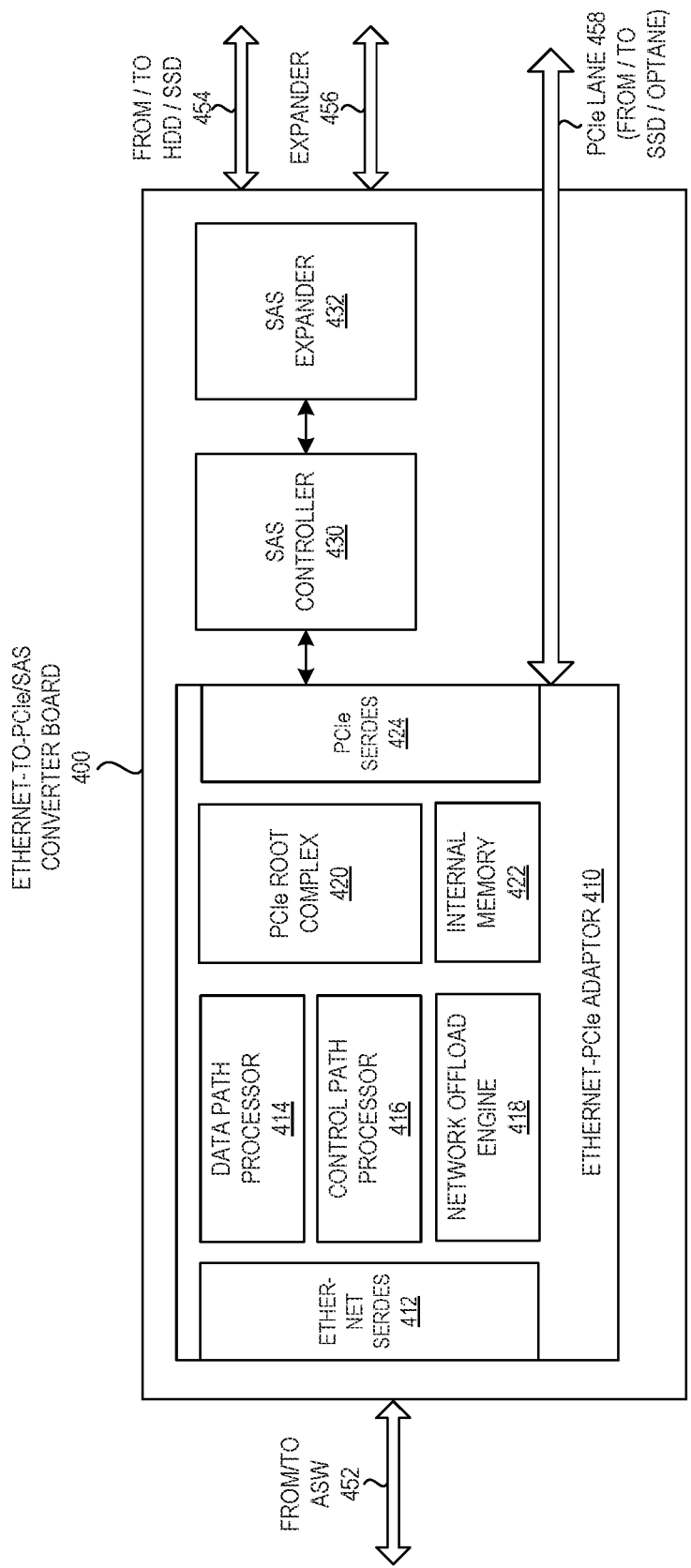
FIG. 4 depicts an exemplary Ethernet-to-PCIe/SAS converter board, in accordance with an embodiment of the present application.

FIG. 4 depicts an exemplary Ethernet-to-PCIe/SAS converter board 400, in accordance with an embodiment of the present application. Ethernet-to-PCIe/SAS converter board 400 can be a card (such as a NIC-to-SAS card) or a converter module, and can include: an Ethernet-PCIe adaptor 410 configured to convert data from a network protocol (e.g., Ethernet) to an I/O protocol (e.g., PCIe) used to access storage drives; an SAS controller 430; and an SAS expander 432. Ethernet-PCIe adaptor 410 can further include: an Ethernet serializer/deserializer ("SerDes") 412 for converting data to/from an Ethernet protocol; a data path processor 414 for processing and managing data path-related information; a control path processor 416 for processing and managing control path-related information; a network offload engine 418 for performing certain computations (e.g., cyclic redundancy checks, encoding/decoding, and virtualization); a PCIe root complex 420 for handling operations, computations, and instructions requiring software and/or firmware; an internal memory 422 which can serve as a data buffer; and a PCIe serializer/deserializer ("SerDes") 424 for converting data to/from a PCIe protocol.

During operation, board 400 can receive data from or send data to an access switch (via a from/to ASW 452 communication). In the example of receiving data, board 400 can receive data via Ethernet-PCIe adaptor 410, which can convert the data received based on an Ethernet protocol to data which can be transmitted based on a PCIe protocol. If the data is to be sent via the PCIe protocol, the system can send the data directly from Ethernet-PCIe adaptor 410 via a PCIe lane 458 to PCIe devices, e.g., an SSD or an optane drive.

The PCIe lanes can also be coupled to, connected to, or in communication with SAS controller 430, to provide an SAS output. SAS expander 432 can be used to provide a further fan-out of the storage drives (i.e., HDDs and SSDs). Thus, if the data is to be sent via an SAS fabric, the system can send the data via the PCIe lanes from Ethernet-PCIe adaptor 410 to SAS controller 430, which can perform any necessary processing on the data, and send the data to SAS expander 432. The system can send the data from SAS expander 432 to an HDD/SDD (via a communication 454) or to a device or drive coupled to, associated with, or in communication with an expander (via a communication 456).

Thus, the converter module depicted in FIG. 4 provides an equivalent Ethernet access for and to the storage drives (not shown), which are accessible via communications 454, 456, and 458 and are also associated with converter board 400. By including this converter module in or coupling this converter module to each collection of storage drives (e.g., each JBOD/JBOF), the embodiments described herein allow a decoupling of the master nodes and the associated JBODs/JBOFs, which can result in a more efficient and flexible configuration of these computing entities in different cabinets.

Mixed Deployment for Multiple SLAs and Enabling High-Capacity Drives

As described above, high-capacity drives may be used in order to achieve a reduction in cost. However, while high-capacity drives can result in a proportional decrease in the IOPS/GB (e.g., as SSDs/HDDs evolve with greater capacity), the overall throughput may not be able to match this proportional decrease. Thus, one storage drive may handle a mixture of requests from applications which require varying IOPS in their service level agreements (SLAs). This mixture may be used to fully utilize both the capacity and the throughput of the storage drive. That is, some applications may require a high capacity but may experience a low IOPS in order to balance the decreasing IOPS/GB on average. Based on the differing design of various storage drives (and storage products), this can result in a change in the ratio of master nodes versus storage drives.

In the embodiments described herein, the system can provide this mixed deployment by storing data in a storage drive or collection of storage drives (e.g., a JBOD) based on requirements or resource requirements of different applications. That is, the decoupled and logically grouped master nodes and storage drives can be dynamically grouped or associated based on the current demands to obtain an improved efficiency in resource allocation, which can in turn result in a more efficient overall storage system. The agility and flexibility of this dynamic reconfiguration can thus more efficiently and effectively utilize the capacity of today's high-density storage drives by concurrently serving multiple applications with different requirements (e.g., capacity requirements, IOPS requirements, and other requirements which may be associated with an SLA).

Figure 5:
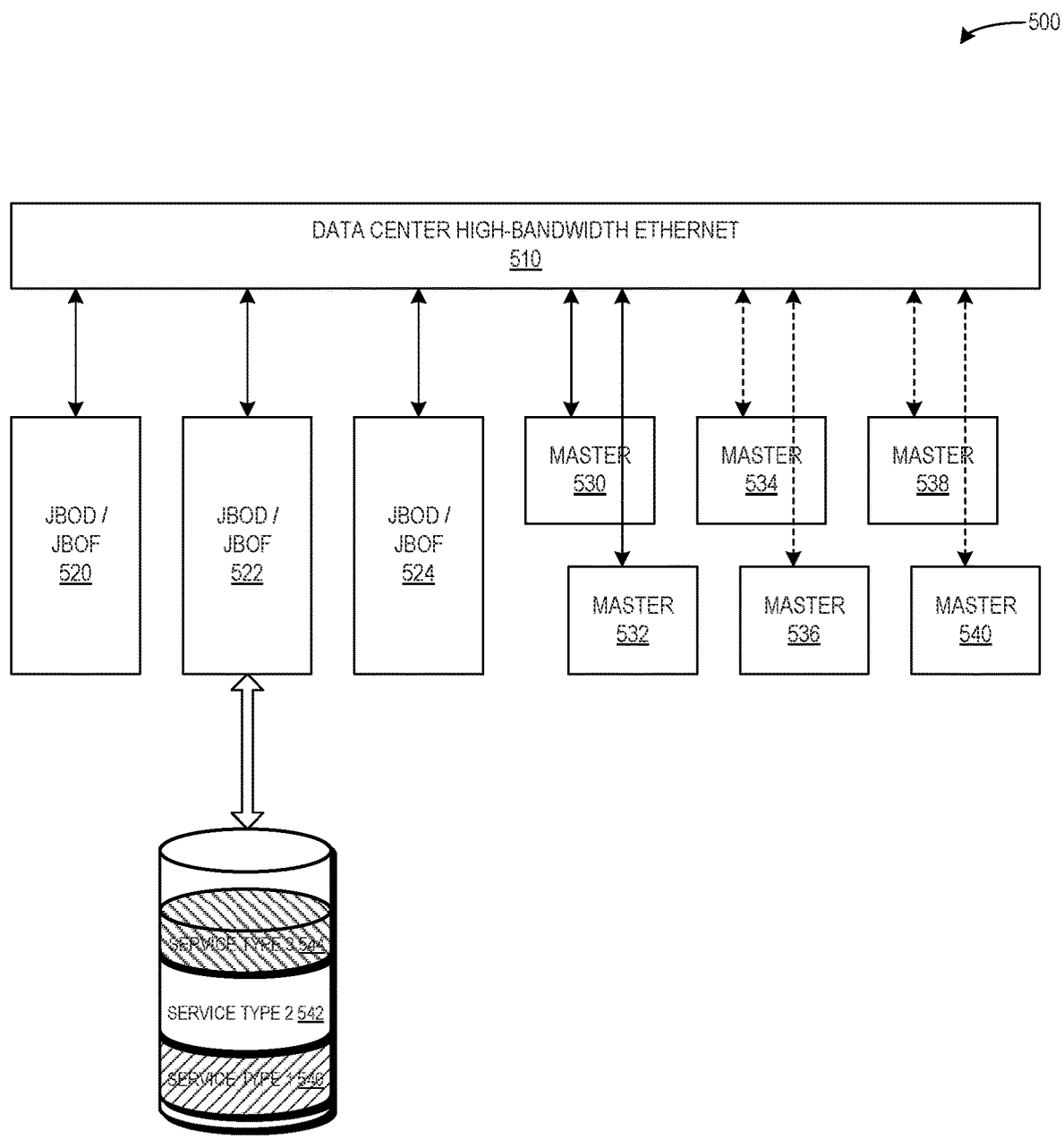
FIG. 5 depicts an exemplary environment which facilitates a mixed deployment which accommodates multiple SLAs and efficiently enables high-capacity drives, in accordance with an embodiment of the present application.

FIG. 5 depicts an exemplary environment 500 which facilitates a mixed deployment which accommodates multiple SLAs and efficiently enables high-capacity drives, in accordance with an embodiment of the present application. Environment 500 can include a data center high-bandwidth Ethernet 510, via which multiple master nodes and JBODs/JBOFs can communicate, including: JBOD/JBOFs 520, 522, and 524, and master nodes 530, 532, 534, 536, 538, and 540. Each JBOD/JBOF can include storage drives which are accessible through Ethernet 510 via pod switches and access switches (not shown), similar to the Ethernet topology depicted above in relation to FIG. 3. The master nodes may be dynamically grouped or associated with one or more JBODs/JBOFs, which can significantly reduce or eliminate any idling of resources based on the prior art environment of FIG. 1, i.e., the isolated rack-scale or cabinet-scale SAS system.

For example, master nodes 530 and 532 can be in communication and associated with JBODs/JBOFs 520, 522, and 524, as indicated by the solid lines with double-sided arrows from these computing entities to Ethernet 510. Each JBOD can include a mixed deployment of data, i.e., data from applications with different resource requirements. As an example, JBOD/JBOF 522 is depicted as storing three different service types of data: service type 1 540 data (depicted with right-slanting diagonal lines); service type 2 542 (depicted with no pattern); and service type 3 544 (depicted with left-slanting diagonal lines).

Furthermore, during operation, the system can determine or detect a condition to dynamically associate a master node (or master nodes) with a different plurality of storage drives, as indicated by the dashed lines with double-sided arrows from master nodes 534, 536, 538, and 540 to Ethernet 510. This condition can be based on, e.g.: a difference in capacity and input/output per second (IOPS) requirements between two different requesting applications on a same master node or storage drive; a first predetermined threshold for dynamically associating the master node with another plurality of storage drives; a second predetermined threshold for removing or creating an association between the master node and another plurality of storage drives; an amount of power budgeted to one or more racks/cabinets, e.g., in a data center; an average amount of a number of IOPS per Gigabyte (GB); and a design of a respective storage drive of a plurality of storage drives.

As a result, the embodiments of the object storage system described herein can be deployed in an older or prior generation data center, which may include racks/cabinets with a relatively low power budget which is not sufficient to support the newer high-density storage drives in a current object storage system. Thus, by decoupling the master nodes and the storage drives via a converter module associated with or coupled to each collection of storage drives, and providing a dynamic logical grouping of these decoupled master and storage drives, the embodiments described herein can provide a more flexible configuration of entities in an object storage system, an efficient mixed deployment of applications with different resource requirements, and deployment in scenarios which can handle power budget constraints (i.e., data centers with older equipment).

Method for Facilitating Operation of a Storage System

Figure 6A:
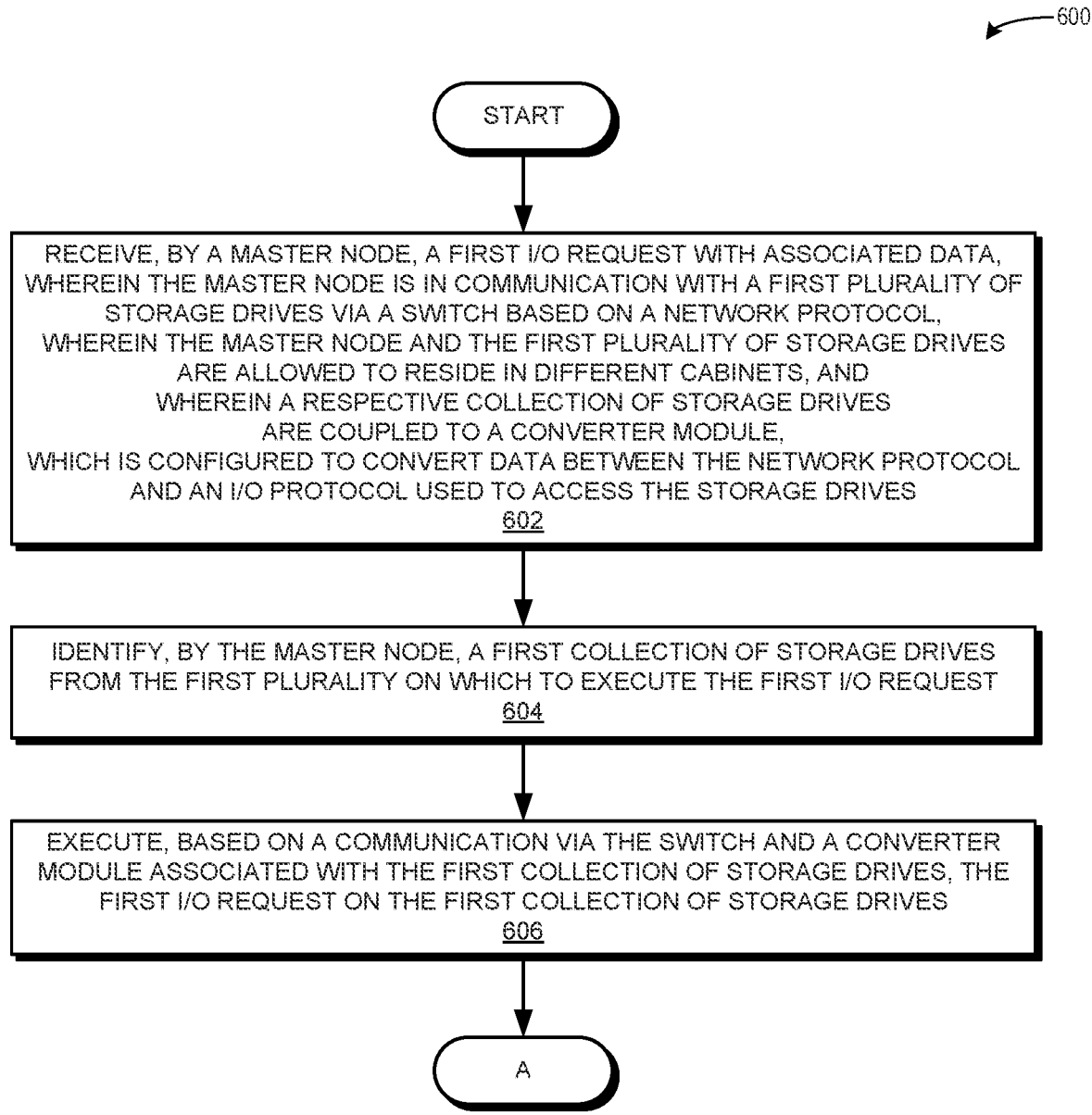
FIG. 6A presents a flowchart illustrating a method for facilitating operation of a storage system, in accordance with an embodiment of the present application.

FIG. 6A presents a flowchart 600 illustrating a method for facilitating operation of a storage system, in accordance with an embodiment of the present application. During operation, the system receives, by a master node, a first I/O request with associated data, wherein the master node is in communication with a first plurality of storage drives via a switch based on a network protocol, wherein the master node and the first plurality of storage drives are allowed to reside in different cabinets, and wherein a respective collection of storage drives are coupled to a converter module, which is configured to convert data between the network protocol and an I/O protocol used to access the storage drives (operation 602). The system identifies, by the master node, a first collection of storage drives from the first plurality on which to execute the first I/O request (operation 604). The system executes, based on a communication via the switch and a converter module associated with the first collection of storage drives, the first I/O request on the first collection of storage drives (operation 606). The operation continues as described at Label A of FIG. 6B.

Figure 6B:
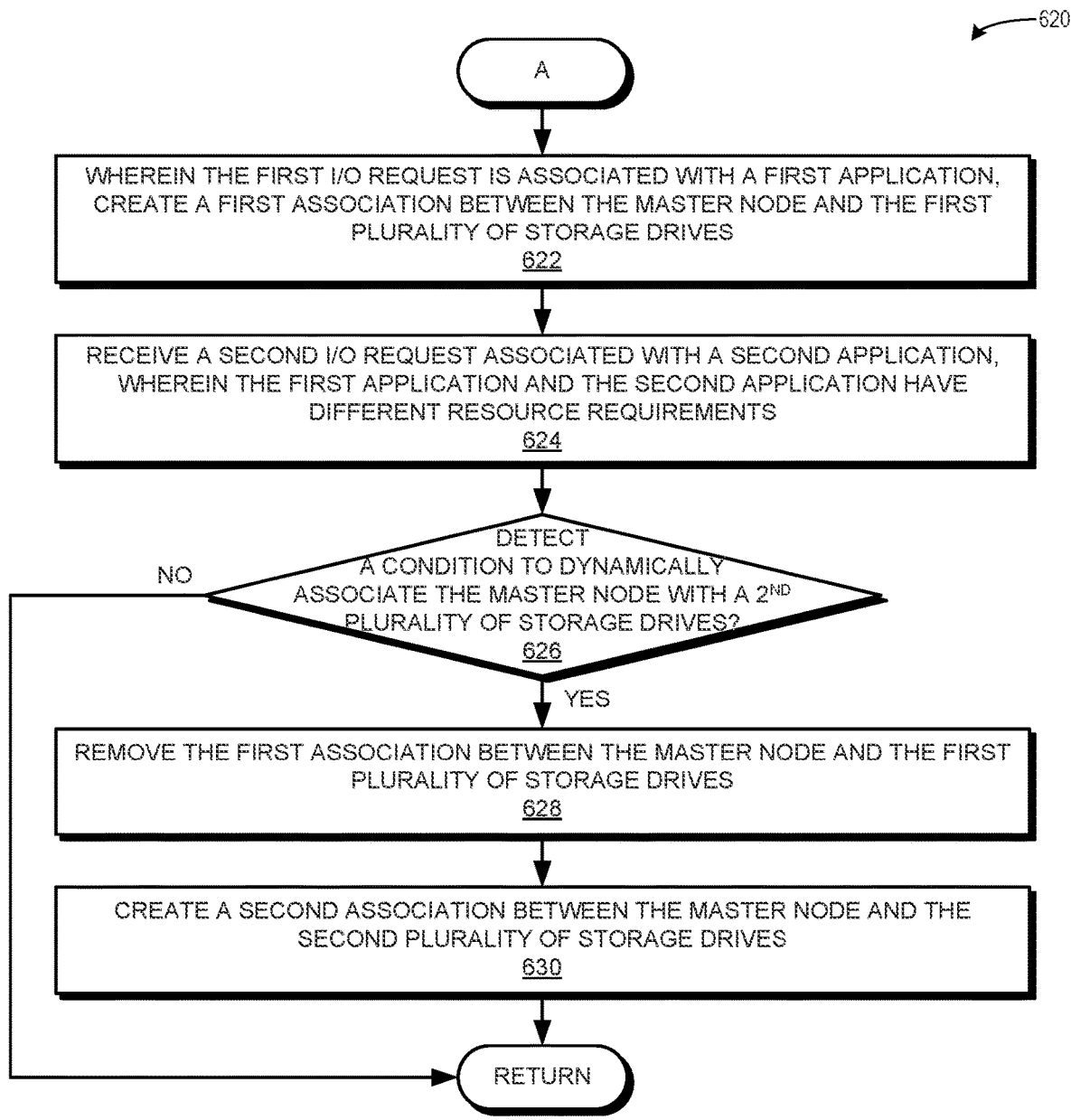
FIG. 6B presents a flowchart illustrating a method for facilitating operation of a storage system, including dynamically re-associating a master node with another plurality or collection of storage drives, in accordance with an embodiment of the present application.

FIG. 6B presents a flowchart 620 illustrating a method for facilitating operation of a storage system, including dynamically re-associating a master node with another plurality or collection of storage drives, in accordance with an embodiment of the present application. Subsequently, wherein the first I/O request is associated with a first application, the system creates a first association between the master node and the first plurality of storage drives (operation 622). The system receives a second I/O request associated with a second application, wherein the first application and the second application have different resource requirements (operation 624). In response to detecting a condition to dynamically associate the master node with a second plurality of storage drives (decision 626), the system removes the first association between the master node and the first plurality of storage drives (operation 628) and creates a second association between the master node and the second plurality of storage drives (operation 630), and the operation returns. In response to not detecting a condition to dynamically associate the master node with a second plurality of storage drives (decision 626), the operation returns.

The second association may be considered a "re-association," in that the system re-associates the master node with a plurality of storage drives other than the first plurality of storage drives. Furthermore, the detected condition to dynamically associate the master node with the second (or other) plurality of storage drives (e.g., to re-associate the master node or master nodes) can be based on, e.g.: a capacity requirement; an IOPS requirement; a predetermined threshold for dynamically associating the master node with the second or a third plurality of storage drives; a second predetermined threshold for removing or creating an association between the master node and another plurality of storage drives; an amount of power budgeted to one or more racks/cabinets in a data center; an average amount of a number of IOPS per GB; and a design of a respective storage drive or other storage product deployed in the JBODs/JBOFs.

Thus, the embodiments described herein provide a high-capacity object storage system with configuration agility and mixed deployment flexibility, by coupling a converter module to each collection or plurality of storage drives (i.e., a JBOD), thus allowing the JBOD to communicate directly with an Ethernet access switch. Furthermore, by dynamically allocating the logical grouping of masters with JBODs, the system can increase or decrease the number of masters associated with any number of JBODs, e.g., if the I/O requests to be executed by a certain plurality of storage drives require more computing power.

Exemplary Computer System and Apparatus

Figure 7:
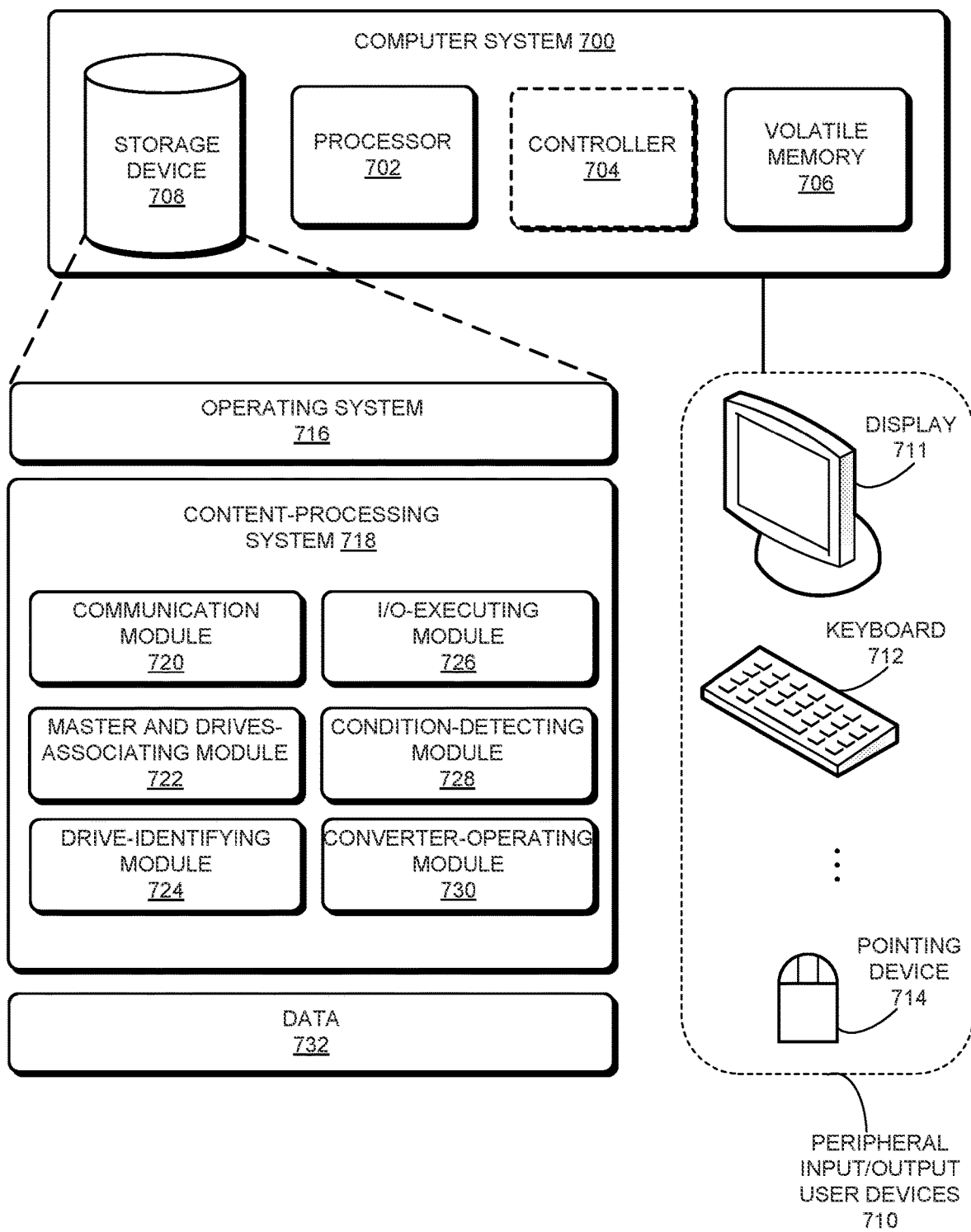
FIG. 7 illustrates an exemplary computer system that facilitates operation of a storage system, in accordance with an embodiment of the present application.

FIG. 7 illustrates an exemplary computer system that facilitates operation of a storage system, in accordance with an embodiment of the present application. Computer system 700 includes a processor 702, a volatile memory 706, and a storage device 708. In some embodiments, computer system 700 can include a controller 704 (indicated by the dashed lines). Volatile memory 706 can include, e.g., random access memory (RAM), that serves as a managed memory, and can be used to store one or more memory pools. Storage device 708 can include persistent storage which can be managed or accessed via processor 702 (or controller 704). Furthermore, computer system 700 can be coupled to peripheral input/output (I/O) user devices 710, e.g., a display device 711, a keyboard 712, and a pointing device 714. Storage device 708 can store an operating system 716, a content-processing system 718, and data 732.

Content-processing system 718 can include instructions, which when executed by computer system 700, can cause computer system 700 or processor 702 to perform methods and/or processes described in this disclosure. Specifically, content-processing system 718 can include instructions for receiving and transmitting data packets, including data to be read or written and an input/output (I/O) request (e.g., a read request or a write request) (communication module 720).

Content-processing system 718 can further include instructions for receiving, by a master node, a first I/O request with associated data, wherein the master node is in communication with a first plurality of storage drives via a switch based on a network protocol, wherein the master node and the first plurality of storage drives are allowed to reside in different cabinets, and wherein a respective collection of storage drives are coupled to a converter module, which is configured to convert data between the network protocol and an I/O protocol used to access the storage drives (communication module 720). Content-processing system 718 can include instructions for identifying, by the master node, a first collection of storage drives from the first plurality on which to execute the first I/O request (drive-identifying module 724). Content-processing system 718 can include instructions for executing, based on a communication via the switch and a converter module associated with the first collection of storage drives, the first I/O request on the first collection of storage drives (I/O-executing module 726).

Content-processing system 718 can additionally include instructions for creating a first association between the master node and the first plurality of storage drives (master and drives-associating module 722). Content-processing system 718 can include instructions for receiving a second I/O request associated with a second application, wherein the first application and the second application have different resource requirements (communication module 720). Content-processing system 718 can include instructions for detecting a condition to dynamically associate the master node with a second plurality of storage drives (condition-detecting module 728). Content-processing system 718 can include instructions for removing the first association between the master node and the first plurality of storage drives (master and drives-associating module 722). Content-processing system 718 can include instructions for creating a second association between the master node and the second plurality of storage drives (master and drives-associating module 722).

Content-processing system 718 can also include instructions for converting data between a network protocol and an I/O protocol, and for performing the operations described above by Ethernet-PCIe adaptor 410 and Ethernet-to-PCIe/SAS converter board 400 of FIG. 4 (converter-operating module 730).

Data 732 can include any data that is required as input or generated as output by the methods and/or processes described in this disclosure. Specifically, data 732 can store at least: data; a request; a read request; a write request; an input/output (I/O) request; data associated with a read request, a write request, or an I/O request; a logical block address (LBA); a physical block address (PBA); an indicator or identifier of a storage drive; an indicator of a plurality or collection of storage drives; a condition; an association between a master node and a plurality of storage drives; a dynamic association between a master node and a plurality of storage drives; a difference in capacity and input/output per second (IOPS) requirements between the first application and the second application; a predetermined threshold for dynamically associating or re-associating the master node with another plurality of storage drives; an amount of power budgeted to a cabinet(s); a number of IOPS; a number of GB; an average amount of a number of IOPS per GB; a design of a storage drive; a resource requirement; a capacity requirement; an IOPS requirement; information relating to an Ethernet protocol or a PCIe protocol; functionality or configuration of an integrated circuit; an indicator of an adaptor, a data path processor, a control path processor, a network offload engine, a PCIe root complex, and an internal memory; an indicator or identifier of an Ethernet-to-PCIe/SAS converter board, card, module, or unit; and an indicator or identifier of a master node, a switch, an SSD, an HDD, an optane drive, or an object storage system.

Figure 8:
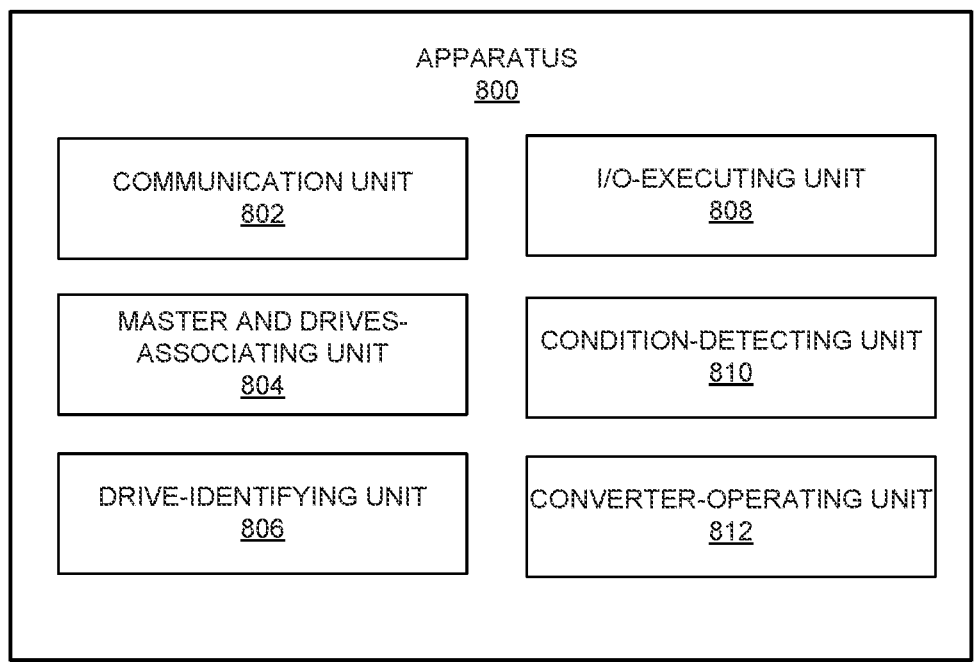
FIG. 8 illustrates an exemplary apparatus that facilitates operation of a storage system, in accordance with an embodiment of the present application.

FIG. 8 illustrates an exemplary apparatus 800 that facilitates operation of a storage system, in accordance with an embodiment of the present application. Apparatus 800 can comprise a plurality of units or apparatuses which may communicate with one another via a wired, wireless, quantum light, or electrical communication channel. Apparatus 800 may be realized using one or more integrated circuits, and may include fewer or more units or apparatuses than those shown in FIG. 8. Further, apparatus 800 may be integrated in a computer system, or realized as a separate device or devices capable of communicating with other computer systems and/or devices. Specifically, apparatus 800 can comprise modules or units 802-810 which are configured to perform functions or operations similar to modules 720-730 of computer system 700 of FIG. 7, including: a communication unit 802; a master and drives-associating unit 804; a drive-identifying unit 806; an I/O-executing unit 808; a condition-detecting unit 810; and a converter-operating unit 812.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A computer-implemented method, comprising:
    receiving, by a master node, a first I/O request with associated data,
        wherein the master node is in communication with a first plurality of storage drives via a switch based on a network protocol,
        wherein the master node and the first plurality of storage drives are allowed to reside in different cabinets,
        wherein a respective collection of storage drives are coupled to a converter module, which is configured to convert data between the network protocol and an I/O protocol used to access the storage drives, and
        wherein the first I/O request is associated with a first application;
    identifying, by the master node, a first collection of storage drives from the first plurality of storage drives on which to execute the first I/O request;
    creating a first association between the master node and the first plurality of storage drives;
    executing, based on a communication via the switch and a converter module associated with the first collection of storage drives, the first I/O request on the first collection of storage drives;
    receiving a second I/O request associated with a second application, wherein the first application and the second application have different resource requirements;
    detecting a condition to dynamically associate the master node with a second plurality of storage drives;
    removing the first association between the master node and the first plurality of storage drives; and
    creating a second association between the master node and the second plurality of storage drives.

2. The method of claim 1, wherein detecting the condition is based on one or more of:
    a difference in capacity and input/output per second (IOPS) requirements between the first application and the second application;
    a first predetermined threshold for dynamically associating the master node with the second or a third plurality of storage drives;
    a second predetermined threshold for removing or creating an association between the master node and another plurality of storage drives;
    an amount of power budgeted to the different cabinets and other cabinets;
    an average amount of a number of IOPS per Gigabyte; and
    a design of a respective storage drive of the first or the second plurality of storage drives.

3. The method of claim 1, wherein the resource requirements include one or more of a capacity requirement and an input/output per second (IOPS) requirement.

4. The method of claim 1,
    wherein the network protocol is an Ethernet protocol, and
    wherein the I/O protocol is a Peripheral Component Interconnect Express (PCIe) protocol.

5. The method of claim 1,
    wherein the converter module includes an adaptor and a controller coupled to at least one expander,
    wherein the adaptor comprises:
        a first integrated circuit configured, based on the network protocol, to process data received from or sent to the switch; and
        a second integrated circuit configured, based on the I/O protocol, to process data sent to or received from the storage drives via the controller and the at least one expander or directly via a lane.

6. The method of claim 5,
    wherein when the second integrated circuit processes data sent to or received from the storage drives via the controller and the at least one expander:
        the controller is a Serial Attached SCSI (SAS) controller,
        the expander is an SAS expander, and
        the storage drives are hard disk drives or solid state drives; and
    wherein when the second integrated circuit processes data sent to or received from the storage drives directly via the lane:
        the lane is a Peripheral Component Interconnect Express (PCIe) lane; and
        the storage drives are solid state drives or optane drives.

7. The method of claim 5, wherein the adaptor further comprises:
    a data path processor;
    a control path processor;
    a network offload engine;
    a PCIe root complex; and
    an internal memory.

8. The method of claim 1,
    wherein the master node, at least one other master node, the switch, at least one other switch, the first plurality of storage drives, and the second plurality of storage drives comprise an object storage system.

9. The method of claim 1, wherein the storage drives are one or more of:
    a solid state drive;
    a hard disk drive;
    a optane drive; and a storage device with a persistent memory which can be accessed via an SAS expander or a PCIe lane.

10. A computer system, comprising:
a switch;
a master node; and
a first plurality of storage drives;
wherein the master node is in communication with the first plurality of storage drives via the switch based on a network protocol,
wherein the master node and the first plurality of storage drives are allowed to reside in different cabinets,
wherein a respective collection of storage drives are coupled to a converter module, which is configured to convert data between the network protocol and an I/O protocol used to access the storage drives, and
wherein the master node comprises a processor and a memory coupled to the processor and storing instructions which, when executed by the processor cause the processor to perform a method, the method comprising:
receiving a first I/O request with associated data;
identifying, a first collection of storage drives from the first plurality of storage drives on which to execute the first I/O request; and
executing, based on a communication via the switch and a converter module associated with the first collection of storage drives, the first I/O request on the first collection of storage drives,
wherein the converter module comprises an adaptor and a controller coupled to at least one expander, and
wherein the adaptor comprises:
a first integrated circuit configured, based on the network protocol, to process data received from or sent to the switch; and
a second integrated circuit configured, based on the I/O protocol, to process data sent to or received from the storage drives via the controller and the at least one expander or directly via a lane.

11. The computer system of claim 10, wherein the first I/O request is associated with a first application, and wherein the method further comprises:
creating a first association between the master node and the first plurality of storage drives;
receiving a second I/O request associated with a second application, wherein the first application and the second application have different resource requirements;
detecting a condition to dynamically associate the master node with a second plurality of storage drives;
removing the first association between the master node and the first plurality of storage drives; and
creating a second association between the master node and the second plurality of storage drives.

12. The computer system of claim 11, wherein detecting the condition is based on one or more of:
a difference in capacity and input/output per second (IOPS) requirements between the first application and the second application;
a first predetermined threshold for dynamically associating the master node with the second or a third plurality of storage drives;
a second predetermined threshold for removing or creating an association between the master node and another plurality of storage drives;
an amount of power budgeted to the different cabinets and other cabinets;
an average amount of a number of IOPS per Gigabyte; and a design of a respective storage drive of the first or the second plurality of storage drives.

13. The computer system of claim 11, wherein the resource requirements include one or more of a capacity requirement and an input/output per second (IOPS) requirement.

14. The computer system of claim 10,
wherein the network protocol is an Ethernet protocol, and
wherein the I/O protocol is a Peripheral Component Interconnect Express (PCIe) protocol.

15. The computer system of claim 10,
wherein when the second integrated circuit processes data sent to or received from the storage drives via the controller and the at least one expander:
the controller is a Serial Attached SCSI (SAS) controller,
the expander is an SAS expander, and
the storage drives are hard disk drives or solid state drives; and
wherein when the second integrated circuit processes data sent to or received from the storage drives directly via the lane:
the lane is a Peripheral Component Interconnect Express (PCIe) lane; and
the storage drives are solid state drives or optane drives.

16. The computer system of claim 10, wherein the adaptor further comprises:
a data path processor;
a control path processor;
a network offload engine;
a PCIe root complex; and
an internal memory.

17. An apparatus, comprising:
a switch;
a master node; and
a first plurality of storage drives;
wherein the master node is in communication with the first plurality of storage drives via the switch based on a network protocol,
wherein the master node and the first plurality of storage drives are allowed to reside in different cabinets,
wherein a respective collection of storage drives are coupled to a converter module, which is configured to convert data between the network protocol and an I/O protocol used to access the storage drives, and
wherein the master node is configured to:
receive a first I/O request with associated data, wherein the first I/O request is associated with a first application;
identify, a first collection of storage drives from the first plurality on which to execute the first I/O request;
create a first association between the master node and the first plurality of storage drives;
execute, based on a communication via the switch and a converter module associated with the first collection of storage drives, the first I/O request on the first collection of storage drives;
receive a second I/O request associated with a second application, wherein the first application and the second application have different resource requirements;
detect a condition to dynamically associate the master node with a second plurality of storage drives;
remove the first association between the master node and the first plurality of storage drives; and create a second association between the master node and the second plurality of storage drives.

* * * * *